United States Patent
Shao

(10) Patent No.: US 12,425,746 B2
(45) Date of Patent: Sep. 23, 2025

(54) SYSTEMS AND METHODS FOR IMAGE CORRECTION

(71) Applicant: ZHEJIANG DAHUA TECHNOLOGY CO., LTD., Zhejiang (CN)

(72) Inventor: Yiyi Shao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 120 days.

(21) Appl. No.: 18/527,338

(22) Filed: Dec. 3, 2023

(65) Prior Publication Data

US 2024/0107180 A1 Mar. 28, 2024

Related U.S. Application Data

(63) Continuation of application No. PCT/CN2022/094163, filed on May 20, 2022.

(30) Foreign Application Priority Data

Jun. 25, 2021 (CN) .......................... 202110709858.5
Jul. 13, 2021 (CN) .......................... 202110788764.1

(51) Int. Cl.
  *H04N 5/335* (2011.01)
  *H04N 23/83* (2023.01)
  *H04N 23/85* (2023.01)

(52) U.S. Cl.
  CPC ............. *H04N 23/83* (2023.01); *H04N 23/85* (2023.01)

(58) Field of Classification Search
  CPC ..................................................... H04N 5/202
  See application file for complete search history.

(56) References Cited

U.S. PATENT DOCUMENTS

| 8,189,243 B1 | 5/2012 | Borg |
| 9,324,285 B2 * | 4/2016 | Furihata ............... G09G 3/3648 |

(Continued)

FOREIGN PATENT DOCUMENTS

| CN | 103079076 A | 5/2013 |
| CN | 105632398 A | 6/2016 |

(Continued)

OTHER PUBLICATIONS

The Extended European Search Report in European Application No. 22827281.1 mailed on Jul. 5, 2024, 8 pages.

(Continued)

*Primary Examiner* — Gary C Vieaux
(74) *Attorney, Agent, or Firm* — METIS IP LLC

(57) ABSTRACT

The present disclosure provides methods and systems for image correction. The method may include obtaining a first frame captured by an image acquisition device, a second frame captured by the image acquisition device prior to the first frame, and a correction coefficient of the first frame; determining, based on the first frame and the second frame, whether a gamma curve of the image acquisition device has been adjusted; in response to determining that the gamma curve of the image acquisition device has been adjusted, determining an adjustment coefficient of the correction coefficient based on the first frame and the second frame; and adjusting, based on the adjustment coefficient, the correction coefficient of the first frame.

11 Claims, 9 Drawing Sheets

(56) References Cited

U.S. PATENT DOCUMENTS

| | | | |
|---|---|---|---|
| 2006/0103862 A1 | 5/2006 | Kurumisawa et al. | |
| 2011/0134152 A1* | 6/2011 | Furihata | G09G 3/3648 345/690 |
| 2011/0148910 A1 | 6/2011 | Botzas et al. | |
| 2013/0321673 A1 | 12/2013 | Lim et al. | |

FOREIGN PATENT DOCUMENTS

| | | | |
|---|---|---|---|
| CN | 105827897 A | | 8/2016 |
| CN | 108335271 A | | 7/2018 |
| CN | 108712639 A | | 10/2018 |
| CN | 110933386 A | | 3/2020 |
| CN | 111612702 A | | 9/2020 |
| CN | 111861922 A | | 10/2020 |
| CN | 111866483 A | | 10/2020 |
| CN | 112073703 A | | 12/2020 |
| CN | 112752023 A | | 5/2021 |
| CN | 112767257 A | | 5/2021 |
| CN | 113596422 A | | 11/2021 |
| CN | 113676712 A | | 11/2021 |
| CN | 114359736 B | * | 7/2022 |
| JP | 2003230052 A | | 8/2003 |
| JP | 2006217169 A | | 8/2006 |
| JP | 2014150400 A | | 8/2014 |
| WO | 2011048623 A1 | | 4/2011 |

OTHER PUBLICATIONS

International Search Report in PCT/CN2022/094163 mailed on Jul. 27, 2022, 4 pages.
Written Opinion in PCT/CN2022/094163 mailed on Jul. 27, 2022, 5 pages.
First Office Action in Chinese Application No. 202110709858.5 mailed on Aug. 1, 2022, 12 pages.
First Office Action in Chinese Application No. 202110788764.1 mailed on Nov. 22, 2023, 10 pages.

* cited by examiner

Color Space Comparison

SYSTEMS AND METHODS FOR IMAGE CORRECTION

CROSS-REFERENCE TO RELATED APPLICATIONS

This application is a Continuation of International Application No. PCT/CN2022/094163 filed on May 20, 2022, which claims priority of Chinese Patent Application No. 202110709858.5 filed on Jun. 25, 2021, and Chinese Patent Application No. 202110788764.1 filed on Jul. 13, 2021, the contents of each of which are hereby incorporated by reference.

TECHNICAL FIELD

The present disclosure generally relates to image processing techniques, and more particularly, relates to systems and methods for image correction.

BACKGROUND

Improving the image quality has become a major goal of imaging techniques. Color is an important indicator for evaluating the image quality, and has a great impact on users' perception of images. Therefore, it is desirable to provide systems and methods for image correction, specifically systems and methods for color correction, in order to improve the imaging quality.

SUMMARY

An aspect of the present disclosure relates to a method for image correction implemented on a computing device having at least one processor and at least one storage device. The method may include obtaining a first frame captured by an image acquisition device, a second frame captured by the image acquisition device prior to the first frame, and a correction coefficient of the first frame. The method may include determining, based on the first frame and the second frame, whether a gamma curve of the image acquisition device has been adjusted. The method may also include, in response to determining that the gamma curve of the image acquisition device has been adjusted, determining an adjustment coefficient of the correction coefficient based on the first frame and the second frame. The method may further include adjusting, based on the adjustment coefficient, the correction coefficient of the first frame.

Another aspect of the present disclosure relates to a method for image correction implemented on a computing device having at least one processor and at least one storage device. The method may include obtaining a reference frame captured by an image acquisition device under a color temperature. The method may include determining, based on the color temperature, reference color information of the target frame in a reference color space. The method may further include determining, based on the reference color information, a correction coefficient corresponding to the color temperature for correcting the target frame.

Still another aspect of the present disclosure relates to a system for target detection. The system may include at least one storage device including a set of instructions and at least one processor in communication with the at least one storage device. When executing the set of instructions, the at least one processor may be directed to perform operations including obtaining a first frame captured by an image acquisition device, a second frame captured by the image acquisition device prior to the first frame, and a correction coefficient of the first frame; determining, based on the first frame and the second frame, whether a gamma curve of the image acquisition device has been adjusted; in response to determining that the gamma curve of the image acquisition device has been adjusted, determining an adjustment coefficient of the correction coefficient based on the first frame and the second frame; and adjusting, based on the adjustment coefficient, the correction coefficient of the first frame.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
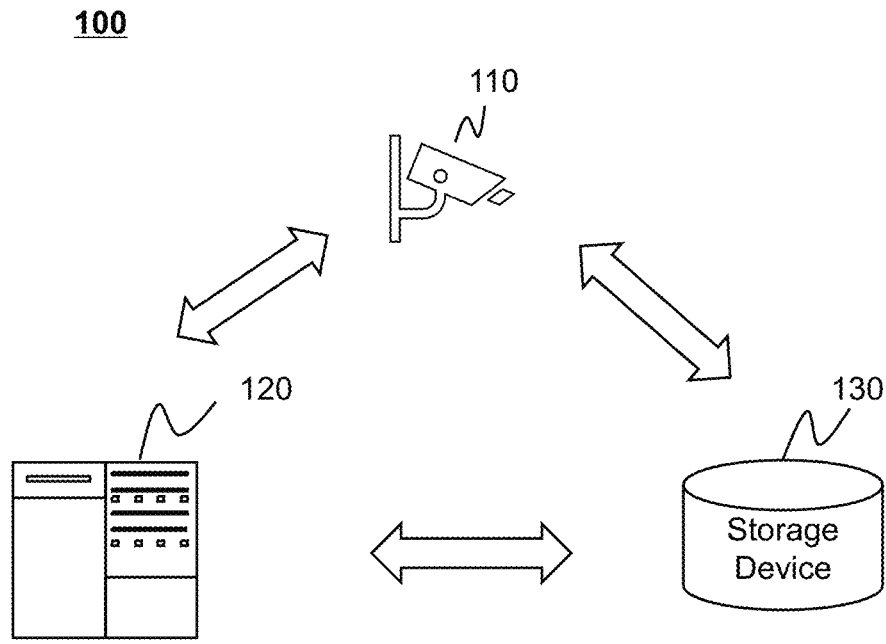
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The present disclosure relates to systems and methods for image correction. The methods may obtain a first frame captured by an image acquisition device, a second frame captured by the image acquisition device prior to the first frame, and a correction coefficient of the first frame. The methods may determine, based on the first frame and the second frame, whether a gamma curve of the image acquisition device has been adjusted. In response to determining that the gamma curve of the image acquisition device has been adjusted, the methods may determine an adjustment coefficient of the correction coefficient based on the first frame and the second frame. Further, the methods may adjust, based on the adjustment coefficient, the correction coefficient of the first frame. By adjusting the correction coefficient based on the adjustment of the gamma curve, the adjustment of the gamma curve may be considered during the image correction, which may reduce or eliminate a color distortion caused by the adjustment of the gamma curve, thereby improving the accuracy of the colors in the first image.

In some embodiments, the methods may obtain a target frame captured by the image acquisition device under a color temperature. The methods may determine, based on the color temperature, reference color information of the target frame in a reference color space. The methods may further determine, based on the reference color information, a correction coefficient corresponding to the color temperature for correcting the target frame. Since the reference color information of the target frame in the reference color space is designed based on human perception of colors, the determined correction coefficient may be more accurate, thereby improving the accuracy of image data acquired by the image acquisition device. In addition, the determination of the correction coefficient based on the reference color information may be automatic, which may not depend on a subjective determination by human eyes and the user experience and improve the accuracy and efficiency of the determination of the correction coefficient.

FIG. 1 is a schematic diagram illustrating an exemplary image correction system 100 according to some embodiments of the present disclosure. As shown, the image correction system 100 may include an image acquisition device 110, a processing device 120, and a storage device 130. In some embodiments, the image acquisition device 110, the processing device 120, and/or the storage device 130 may be connected to and/or communicate with each other via a wireless connection (e.g., a network), a wired connection, or a combination thereof. The connection between the components in the image correction system 100 may be variable. Merely by way of example, the image acquisition device 110 may be connected to the processing device 120 directly as illustrated in FIG. 1 or through a network. As another example, the storage device 130 may be connected to the processing device 120 directly as illustrated in FIG. 1 or through a network.

The image acquisition device 110 may be configured to capture an image frame (e.g., a first frame, a second frame, a reference frame, and/or a target frame). In some embodiments, the image acquisition device 110 may include a camera, a video recorder, an image sensor, etc. Exemplary cameras may include a gun camera, a dome camera, an integrated camera, a monocular camera, a binocular camera, a multi-view camera, a visible light camera, a thermal imaging camera, or the like, or any combination thereof. Exemplary video recorders may include a PC Digital Video Recorder (DVR), an embedded DVR, a visible light DVR, a thermal imaging DVR, or the like, or any combination thereof. Exemplary image sensors may include a charge coupled device (CCD) image sensor, a complementary metal oxide semiconductor (CMOS) image sensor, or the like, or any combination thereof. In some embodiments, the image acquisition device 110 may transmit the captured image frame (e.g., the first frame, the second frame, the reference frame, and/or the target frame) to one or more components (e.g., the processing device 120, the storage device 130) of the image correction system 100.

The processing device 120 may process data and/or information obtained from one or more components (the image acquisition device 110 and/or the storage device 130)

of the image correction system 100. For example, the processing device 120 may determine and/or adjust a correction coefficient of the image frame captured by the image acquisition device 110. In some embodiments, the processing device 120 may be a single server or a server group. The server group may be centralized or distributed. In some embodiments, the processing device 120 may be local or remote. For example, the processing device 120 may access information and/or data stored in the image acquisition device 110 and/or the storage device 130. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the processing device 120 may be implemented by a computing device. For example, the computing device may include a processor, a storage, an input/output (I/O), and a communication port. The processor may execute computer instructions (e.g., program codes) and perform functions of the processing device 120 in accordance with the techniques described herein. The computer instructions may include, for example, routines, programs, objects, components, data structures, procedures, modules, and functions, which perform particular functions described herein.

The storage device 130 may store data/information obtained from the image acquisition device 110 and/or any other component of the image correction system 100. In some embodiments, the storage device 130 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. In some embodiments, the storage device 130 may store one or more programs and/or instructions to perform exemplary methods described in the present disclosure.

In some embodiments, the storage device 130 may be communicated with one or more other components (e.g., the image acquisition device 110, the processing device 120) in the image correction system 100. One or more components in the image correction system 100 may access the data or instructions stored in the storage device 130. In some embodiments, the storage device 130 may be part of the processing device 120.

In some embodiments, the image correction system 100 may further include a network and/or at least one terminal. The network may facilitate the exchange of information and/or data for the image correction system 100. In some embodiments, one or more components (e.g., the image acquisition device 110, the processing device 120, the storage device 130) of the image correction system 100 may transmit information and/or data to other component(s) of the image correction system 100 via the network. In some embodiments, the network may be any type of wired or wireless network, or combination thereof.

The at least one terminal may be configured to receive information and/or data from the image acquisition device 110, the processing device 120, and/or the storage device 130, such as, via the network. For example, the at least one terminal may receive the captured image frame (e.g., the first frame, the second frame, the reference frame, and/or the target frame) from the image acquisition device 110. In some embodiments, the at least one terminal may process information and/or data received from the image acquisition device 110, the processing device 120, and/or the storage device 130. In some embodiments, the at least one terminal may provide a user interface via which a user may view information and/or input data and/or instructions to the image correction system 100. In some embodiments, the at least one terminal may include a mobile phone, a computer, a wearable device, or the like, or any combination thereof. In some embodiments, the at least one terminal may include a display that can display information in a human-readable form, such as text, image, audio, video, graph, animation, or the like, or any combination thereof. The display of the at least one terminal may include a cathode ray tube (CRT) display, a liquid crystal display (LCD), a light-emitting diode (LED) display, a plasma display panel (PDP), a three-dimensional (3D) display, or the like, or a combination thereof.

Figure 2A:
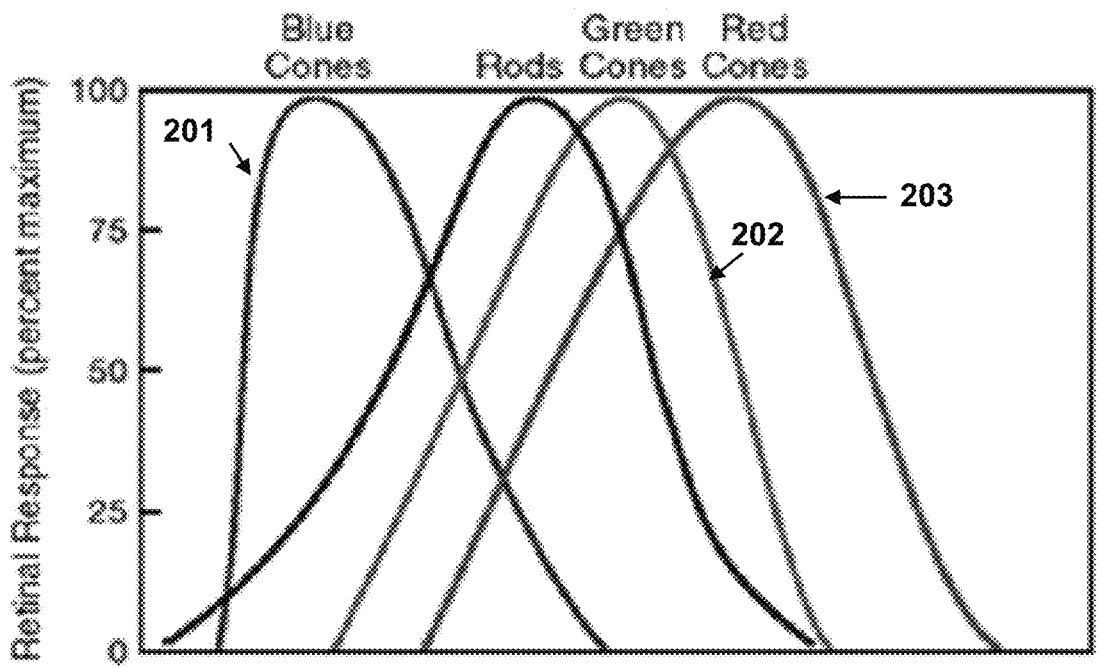
FIG. 2A is a schematic diagram illustrating exemplary spectral response curves of an image acquisition device according to some embodiments of the present disclosure.
Figure 2B:
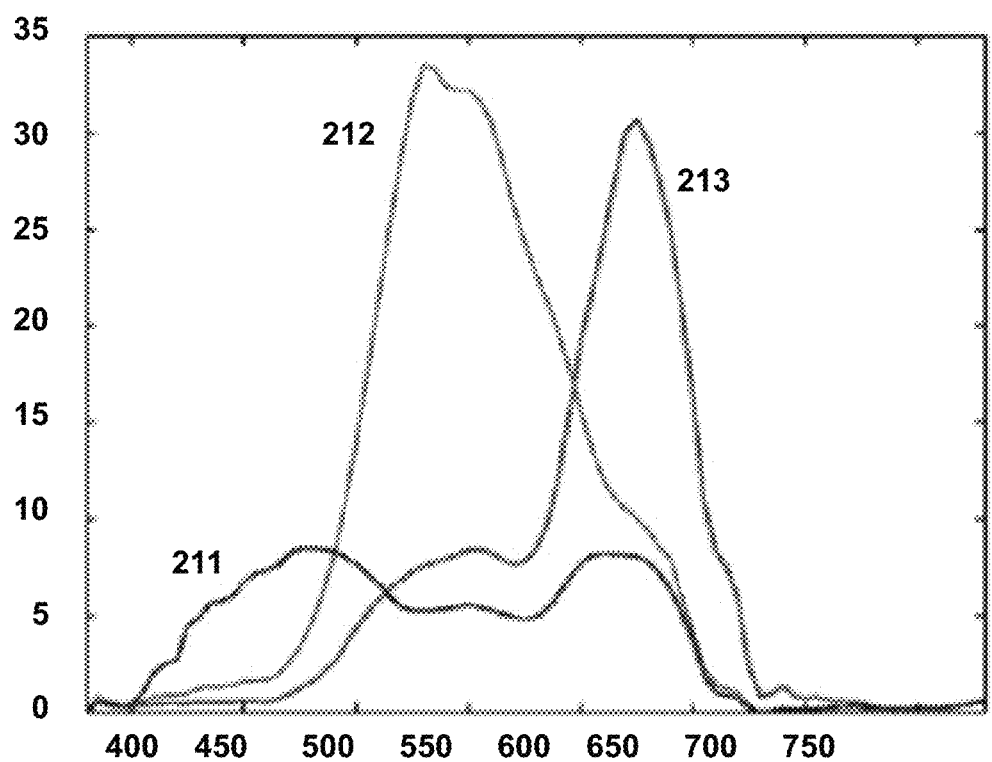
FIG. 2B is a schematic diagram illustrating exemplary spectral response curves of human eyes according to some embodiments of the present disclosure.

FIG. 2A is a schematic diagram illustrating exemplary spectral response curves of an image acquisition device according to some embodiments of the present disclosure. FIG. 2B is a schematic diagram illustrating exemplary spectral response curves of human eyes according to some embodiments of the present disclosure.

As shown in FIG. 2A, a line 201 may represent a spectral response curve of an image acquisition device (e.g., the image acquisition device 110) to blue, a line 202 may represent a spectral response curve of the image acquisition device to green, and a line 203 may represent a spectral response curve of the image acquisition device to red. As shown in FIG. 2B, a line 211 may represent a spectral response curve of human eyes to blue, a line 212 may represent a spectral response curve of human eyes to green, and a line 213 may represent a spectral response curve of human eyes to red.

Obviously, the spectral response curves of the image acquisition device may be different from the spectral response curves of human eyes. Therefore, colors in an image of a scene captured by the image acquisition device may be different from colors of the scene perceived by human eyes. In addition, the image captured by the image acquisition device usually needs to be processed (e.g., subjected to a white balance), which may further increase the difference between the colors in the image captured by the image acquisition device and the colors of the captured scene perceived by human eyes. For the convenience of descriptions, the difference between the colors in the image captured by the image acquisition device and the colors of the captured scene perceived by human eyes is referred to as the color distortion. Therefore, image correction may be performed on the image captured by the image acquisition device to reduce or eliminate the difference, which may improve the accuracy of the colors in the image captured by the image acquisition device.

Figure 3:
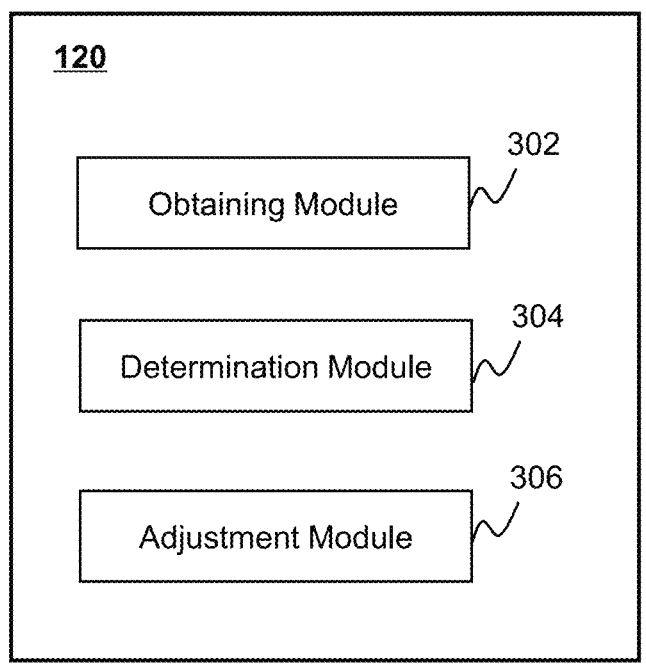
FIG. 3 is a block diagram illustrating an exemplary processing device according to some embodiments of the present disclosure.

FIG. 3 is a block diagram illustrating an exemplary processing device 120 according to some embodiments of the present disclosure. In some embodiments, the processing device 120 may be in communication with a computer-readable storage medium (e.g., the storage device 130 illustrated in FIG. 1) and may execute instructions stored in the computer-readable storage medium. The processing device 120 may include an obtaining module 302, a determination module 304, and an adjustment module 306.

The obtaining module 302 may be configured to obtain a first frame captured by an image acquisition device, a second frame captured by the image acquisition device prior to the first frame, and a correction coefficient of the first frame. In some embodiments, the second frame may be captured prior to the first frame. That is, a time point at which the second frame is captured may be earlier than a time point at which the first frame is captured. In some embodiments, the first frame and the second frame may be two adjacent image frames captured by the image acquisition device. More descriptions regarding the obtaining of the first frame, the second frame, and the correction coefficient may be found elsewhere in the present disclosure. See, e.g., operation 402 and relevant descriptions thereof.

The determination module 304 may be configured to determine, based on the first frame and the second frame, whether a gamma curve of the image acquisition device has been adjusted. The gamma curve may refer to a non-linear curve representing a relationship between the brightness of a scene perceived by humans and the brightness of the scene in a frame captured by the image acquisition device. Exemplary adjustments of the gamma curve may include a modification, an update, a replacement, etc., of the gamma curve. More descriptions regarding the determination of whether the gamma curve of the image acquisition device has been adjusted may be found elsewhere in the present disclosure. See, e.g., operation 404 and relevant descriptions thereof.

The determination module 304 may be further configured to determine an adjustment coefficient of the correction coefficient based on the first frame and the second frame. More descriptions regarding the determination of the adjustment coefficient of the correction coefficient may be found elsewhere in the present disclosure. See, e.g., operation 406 and relevant descriptions thereof.

The adjustment module 306 may be configured to adjust, based on the adjustment coefficient, the correction coefficient of the first frame. More descriptions regarding the determination of the adjustment coefficient of the correction coefficient may be found elsewhere in the present disclosure. See, e.g., operation 408 and relevant descriptions thereof.

It should be noted that the above descriptions of the processing device 120 are provided for the purposes of illustration, and not intended to limit the scope of the present disclosure. For persons having ordinary skills in the art, various variations and modifications may be conducted under the guidance of the present disclosure. However, those variations and modifications do not depart from the scope of the present disclosure. In some embodiments, the processing device 120 may include one or more other modules. For example, the processing device 120 may include a storage module to store data generated by the modules in the processing device 120. In some embodiments, any two of the modules may be combined as a single module, and any one of the modules may be divided into two or more units.

Figure 4:
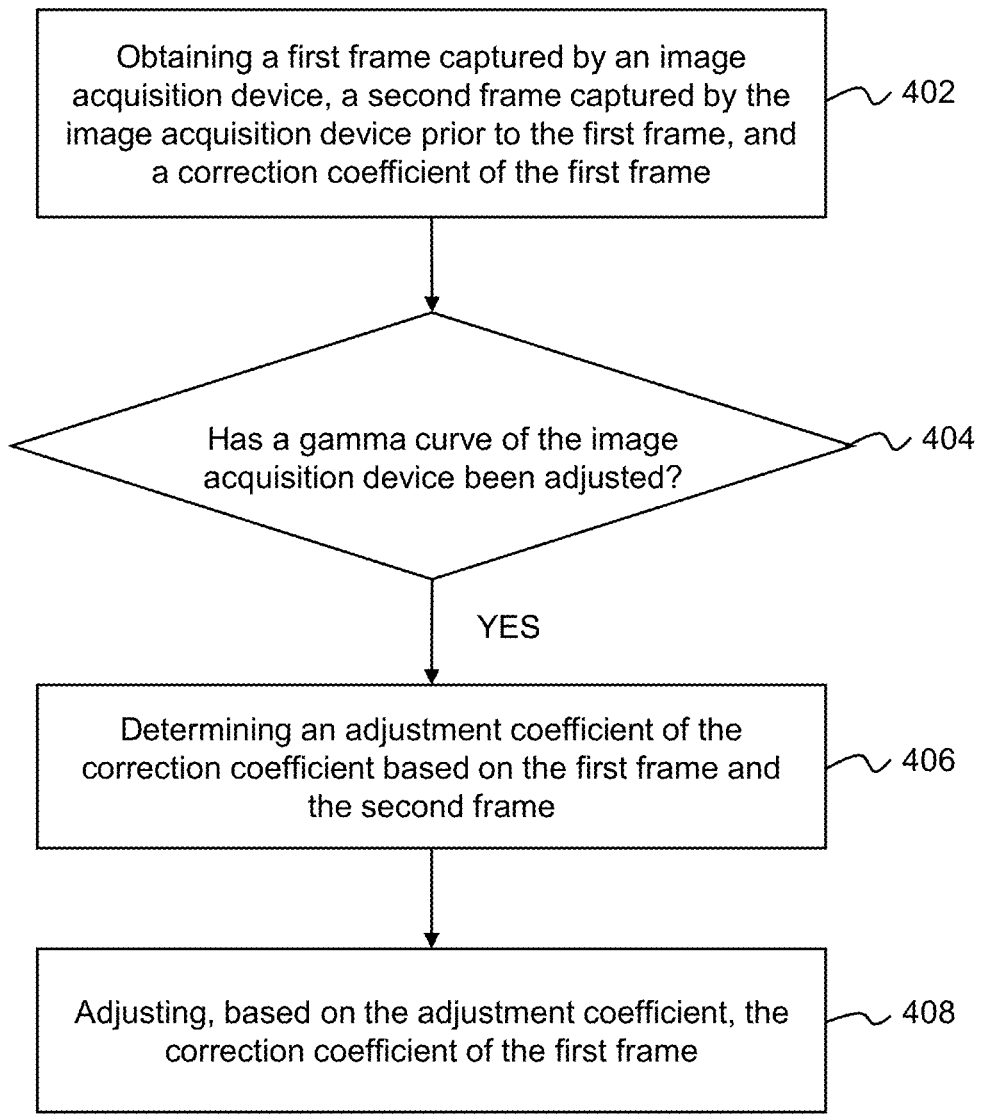
FIG. 4 is a flowchart illustrating an exemplary process for adjusting a correction coefficient according to some embodiments of the present disclosure.

FIG. 4 is a flowchart illustrating an exemplary process for adjusting a correction coefficient according to some embodiments of the present disclosure.

As aforementioned, image correction may be performed on an image captured by an image acquisition device to reduce or eliminate the color distortion. Conventionally, a correction coefficient (e.g., a color correction matrix (CCM)) may be used to perform the image correction. In some embodiments, the correction coefficient may be used to correct differences between spectral response curves of the image acquisition device and spectral response curves of human eyes, thereby reducing or eliminating the color distortion. Specifically, the image captured by the image acquisition device may be corrected by obtaining a product of statistical values of red-green-blue (RGB) channels of the image and the CCM according to Equation (1) as below:

$$\begin{bmatrix} R' \\ G' \\ B' \end{bmatrix} = \begin{bmatrix} CCM11 & CCM12 & CCM13 \\ CCM21 & CCM22 & CCM23 \\ CCM31 & CCM32 & CCM33 \end{bmatrix} \times \begin{bmatrix} R' \\ G' \\ B' \end{bmatrix}, \quad (1)$$

where $$\begin{bmatrix} CCM11 & CCM12 & CCM13 \\ CCM21 & CCM22 & CCM23 \\ CCM31 & CCM32 & CCM33 \end{bmatrix}$$

may represent the CCM, R may represent a statistical value of the red channel of the image, G may represent a statistical value of the green channel, B may represent a statistical value of the blue channel, R' may represent a corrected statistical value of the red channel, G' may represent a corrected statistical value of the green channel, and B' may represent a corrected statistical value of the blue channel.

Merely by way of example, a set of CCMs may be calibrated in advance at different color temperatures (e.g., a high color temperature, a medium color temperature, and a low color temperature), and a target CCM for correcting a certain frame may be determined based on the set of CCMs and an estimated color temperature of the certain frame.

However, in actual use, if parameters (e.g., an imaging position, an imaging angle, an imaging magnification, etc.) of the image acquisition device are altered, the contrast of images captured by the image acquisition device may vary. To reduce the effect of the contrast variation and improve a dynamic range of the image acquisition device, a contrast curve (also referred to as a gamma curve) of the image acquisition device may be adjusted in real time. The adjustment of the gamma curve may be used to control the contrast to be within a certain range. In some embodiments, the gamma curve may be adjusted based on a mapping relationship of brightness, for example, a brightness may be adjusted to another brightness by looking up the gamma curve. Since each of the three color elements (i.e., a hue, a saturation, and the brightness) has an effect on the perception of the color by human eyes, the adjustment of the gamma curve may have an effect on the perception of the color by human eyes. However, when the correction coefficient is used to perform the image correction, the effect of the adjustment of the gamma curve is commonly ignored, which results in an inconsistency between the colors in the image captured by the image acquisition device and the colors of the captured scene perceived by human eyes. Therefore, before using the correction coefficient to perform the image correction, the correction coefficient may be adjusted to adapt the adjustment of the gamma curve. Specifically, the processing device 120 of the image correction system 100 may perform the process 400 to adjust the correction coefficient.

In 402, the processing device 120 (e.g., the obtaining module 302) may obtain a first frame captured by an image acquisition device, a second frame captured by the image acquisition device prior to the first frame, and a correction coefficient of the first frame.

In some embodiments, the second frame may be captured prior to the first frame. That is, a time point at which the second frame is captured may be earlier than a time point at which the first frame is captured. For example, the image acquisition device (e.g., the image acquisition device 110) may capture the first frame at a current time point, and capture the second frame at a previous time point. In some embodiments, the first frame and the second frame may be two adjacent image frames captured by the image acquisition device. For example, each time the image acquisition device captures a current frame, the processing device 120 may designate the current frame as the first frame, and a previous frame of the current frame as the second frame, and implement the process 400 on the first and second frames.

In some embodiments, the processing device 120 may obtain the first frame and the second frame from the image acquisition device (e.g., the image acquisition device 110) or a storage device (e.g., the storage device 130). In some embodiments, the processing device 120 may obtain the first frame and the second frame by processing data. For example, the image acquisition device (e.g., the image acquisition device 110) may capture a video, and the processing device 120 may perform a framing operation on the video to obtain the first frame and the second frame, wherein the second frame is captured earlier than the first frame in the video.

The correction coefficient of the first frame may be used to correct the first frame (e.g., colors of the first frame), thereby reducing or eliminating the color distortion.

In some embodiments, the processing device 120 may determine a first color temperature corresponding to the first frame. A color temperature corresponding to a frame may refer to a temperature of an ideal black-body radiator that radiates light of a color comparable to that of a light source when the frame is captured. For example, the processing device 120 may obtain a corresponding relationship (also referred to as a first corresponding relationship) between reference color temperatures and reference white balance parameters, obtain a white balance parameter of the image acquisition device (e.g., the image acquisition device 110) corresponding to the first frame, and determine the first color temperature corresponding to the first frame based on the white balance parameter and the first corresponding relationship. The first corresponding relationship may be determined in advance by operating the image acquisition device to capture images of a scene under different experiment environments having different reference color temperatures and determining a reference white balance parameter of the image acquisition device corresponding to each reference color temperature. It should be noted that the description of the determination of the first color temperature is provided for the purposes of illustration, and not intended to be limiting.

The processing device 120 may also obtain a corresponding relationship (also referred to as a second corresponding relationship) between reference color temperatures and reference correction coefficients. In some embodiments, the second corresponding relationship may be previously determined. In some embodiments, the second corresponding relationship may be obtained by determining a reference correction coefficient corresponding to each reference color temperature. More descriptions regarding the determination of the reference correction coefficient may be found elsewhere in the present disclosure (e.g., FIGS. 7-9 and the descriptions thereof).

Further, the processing device 120 may determine, based on the first color temperature and the second corresponding relationship, the correction coefficient of the first frame. For example, the second corresponding relationship may be represented as a table including different reference color temperatures and their corresponding CCMs, and the processing device 120 may determine the CCM of the first frame by looking up the table based on the first color temperature. In some embodiments, if the first color temperature is within a range between two reference color temperatures in the second corresponding relationship and is different from each of the two reference color temperatures, the correction coefficient of the first frame may be determined by performing an interpolation operation. For instance, the first color temperature is 1200K that is between two reference color temperatures 1000K and 2000K, the correction coefficient of the first frame may be determined by performing the interpolation operation on a reference correction coefficient corresponding to 1000K and a reference correction coefficient corresponding to 2000K.

In 404, the processing device 120 (e.g., the determination module 304) may determine, based on the first frame and the second frame, whether a gamma curve of the image acquisition device has been adjusted.

The gamma curve (also referred to as a contrast curve) may refer to a non-linear curve representing a relationship between the brightness of a scene perceived by humans and the brightness of the scene in a frame captured by the image acquisition device. The image acquisition device may include a plurality of gamma curves corresponding to different scenes. In some embodiments, when operating parameters (e.g., an imaging position, an imaging angle, an imaging magnification, etc.) of the image acquisition device are altered, the image acquisition device may adjust its gamma curve. That is, when the first frame is not the current frame captured by the image acquisition device, the gamma curve used by the image acquisition device when capturing the first frame may be different from the original gamma curve of the image acquisition device. The original gamma curve may be a default gamma curve used by the image acquisition device or the gamma curve that has been used by the image acquisition device (e.g., when capturing the second frame). Therefore, after the first frame is obtained, the processing device 120 may determine, based on the first frame and the second frame, whether the gamma curve of the image acquisition device has been adjusted. Exemplary adjustments of the gamma curve may include a modification, an update, a replacement, etc., of the gamma curve.

In some embodiments, the adjustment of the gamma curve may result in that at least one feature parameter of the first frame is different from the at least one feature parameter of the second frame. Therefore, the processing device 120 may determine whether the gamma curve of the image acquisition device has been adjusted based on at least one first value of the at least one feature parameter of the first frame and at least one second value of at least one feature parameter of the second frame. The at least one feature parameter may include a saturation, a hue, or the like, or any combination thereof. The saturation of a frame may reflect a color vividness (or a purity) of the frame. For example, a value of the saturation may be within a range from 0% to 100%, wherein the value 100% represents that the frame is in a primary color state, and the value 0% represents that the frame is in an achromatic state. The hue of a frame may refer to an appearance of colors in the frame. For example, a value of the hue may be within a range from 0 degrees to 360 degrees, and different degrees may correspond to different colors (e.g., 0 degrees corresponds to the red).

In some embodiments, the processing device 120 may determine the at least one first value of at least one feature parameter of the first frame. The processing device 120 may also determine at least one second value of the at least one feature parameter of the second frame. Further, the processing device 120 may determine, based on the at least one first value and the at least one second value, whether the gamma curve of the image acquisition device has been adjusted.

For illustration purposes, the determination of the first value of the saturation of the first frame (referred to as a first saturation for brevity) is described as an example. For example, the processing device 120 may obtain a corresponding relationship (also referred to as a third corresponding relationship) between the reference color temperatures and reference values of the saturation, and determine a first saturation of the first frame based on the first color temperature corresponding to the first frame and the third corresponding relationship. In some embodiments, the third corresponding relationship may be previously determined. In some embodiments, the third corresponding relationship may be determined in advance by determining a reference value of the saturation corresponding to each reference color temperature. In some embodiments, the third corresponding relationship may be represented as a table including different reference color temperatures and their corresponding reference values of the saturation, and the first saturation may be determined by looking up the table based on the first color temperature. In some embodiments, if the first color temperature is within a range between two reference color temperatures in the third corresponding relationship and is different from each of the two reference color temperatures, the first saturation may be determined by performing an interpolation operation. For instance, the first color temperature is 1200K that is between two reference color temperatures 1000K and 2000K, the first saturation may be determined by performing the interpolation operation on a value of the saturation corresponding to 1000K and a value of the saturation corresponding to 2000K.

As another example, the processing device 120 may determine the first saturation of the first frame based on values of red, green, and blue channels (also referred to as RGB channels) of the first frame and a count of bytes representing a size of the first frame. The count of bytes representing the size of the first frame may include 8 bits, 10 bits, 12 bits, 14 bits, 16 bits, etc. In some embodiments, each count of bytes may correspond to a maximum grayscale value. For example, 8 bits may correspond to a grayscale value of 255. As another example, 10 bits may correspond to a grayscale value of 1023. As still another example, 12 bits may correspond to a grayscale value of 4095. Specifically, the processing device 120 may obtain a plurality of image blocks by dividing the first frame into the plurality of image blocks, and determine values of RGB channels of each image block. The values of the RGB channels of each image block may include a value of a red channel, a value of a green channel, and a value of a blue channel. The processing device 120 may also determine a maximum value and a minimum value among the values of the RGB channels of the plurality of image blocks. The processing device 120 may determine the maximum grayscale value based on the count of bytes. In some embodiments, the maximum grayscale value may be determined according to Equation (2) as below:

$$M=2^n-1, \qquad (2)$$

where M may represent the maximum grayscale value, and n may represent the count of bytes.

The processing device 120 may further determine the first saturation of the first frame based on the maximum value, the minimum value, and the maximum grayscale value. In some embodiments, the first saturation may be determined according to Equation (3) as below:

$$\text{Saturation}=(M\times(\max-\min))\div(M-|\max+\min-M|), \qquad (3)$$

where max may represent the maximum value, min may represent the minimum value, and Saturation may represent the first saturation.

By dividing the first frame into the plurality of image blocks and determining the values of the RGB channels of the plurality of image blocks, the accuracy and the efficiency of the determination of the first saturation may be improved.

As still another example, the processing device 120 may determine the first saturation of the first frame based on a difference (also referred to as a first difference) between the first color temperature corresponding to the first frame and a second color temperature corresponding to the second frame. For example, if the first difference does not exceed a difference threshold (also referred to as a first difference threshold), the processing device 120 may designate a second value of the saturation of the second frame (referred to as the second saturation for brevity) as the first saturation of the first frame.

In some embodiments, the processing device 120 may determine whether the first frame is the preliminary frame (e.g., the earliest frame of a video stream). If the first frame is the preliminary frame, the processing device 120 may determine the first saturation of the first frame based on the third corresponding relationship. If the first frame is not the preliminary frame, the processing device 120 may determine whether the first difference between the first color temperature and the second color temperature exceeds the first difference threshold. If the first difference doesn't exceed the first difference threshold, the processing device 120 may determine the first saturation of the first frame based on the third corresponding relationship, or designate the second saturation of the second frame as the first saturation of the first frame. If the first difference exceeds the first difference threshold, the processing device 120 may determine the first saturation of the first frame based on the values of the RGB channels of the first frame and the count of bytes representing the size of the first frame. In some embodiments, the first difference threshold may be determined based on the system default setting, or set manually by a user, or determined according to an actual need. By setting the first difference threshold, an appropriate approach for determining the first saturation may be adopted, thereby improving the efficiency of the determination of the first saturation.

After the at least one first value and the at least one second value are determined, the processing device 120 may determine whether the gamma curve of the image acquisition device has been adjusted. For example, for a feature parameter, the processing device 120 may determine a difference (also referred to as a second difference) between the corresponding first value and the corresponding second value, and further determine whether the second difference exceeds a difference threshold (also referred to as a second difference threshold). The second difference may include a difference corresponding to each feature value. If the second difference doesn't exceed the second difference threshold, the processing device 120 may determine that the gamma curve of the image acquisition device has not been adjusted. If the second difference exceeds the second difference threshold, the processing device 120 may determine that the gamma curve of the image acquisition device has been adjusted. In some embodiments, the second difference threshold may be determined based on the system default setting, or set manually by the user, or determined according to the actual need.

In some embodiments, the processing device 120 may determine areas of monochrome portions in the first frame, and determine whether a maximum area among the areas exceeds an area threshold. If the maximum area doesn't exceed the area threshold, the processing device 120 may determine whether a difference (also referred to as a third difference) between the first color temperature corresponding to the first frame and the second color temperature corresponding to the second frame exceeds a color temperature threshold. If the third difference exceeds the color temperature threshold, the processing device 120 may determine whether the gamma curve of the image acquisition device has been adjusted based on the first frame and the second frame. More descriptions regarding the area threshold and the color temperature threshold may be found elsewhere in the present disclosure (e.g., FIG. 5 and the descriptions thereof).

If the gamma curve of the image acquisition device has not been adjusted, the processing device 120 may use the correction coefficient to correct the first frame.

If the gamma curve of the image acquisition device has been adjusted, the process 400 may proceed to 406 and 408. In 406, the processing device 120 (e.g., the determination module 304) may determine an adjustment coefficient of the correction coefficient based on the first frame and the second frame.

For example, the processing device 120 may determine the adjustment coefficient of the correction coefficient based on the at least one first value and the at least one second value. Merely by way of example, taking the saturation as an example, the processing device 120 may determine a ratio of the first saturation to the second saturation or a ratio of the second saturation to the first saturation, and designate the ratio as the adjustment coefficient of the correction coefficient.

In 408, the processing device 120 (e.g., the adjustment module 306) may adjust, based on the adjustment coefficient, the correction coefficient of the first frame.

For example, the processing device 120 may adjust the correction coefficient of the first frame by determining a product of the adjustment coefficient and the correction coefficient, and designating the product as the updated correction coefficient. As another example, the processing device 120 may adjust the correction coefficient of the first frame by determining a sum of the adjustment coefficient and the correction coefficient, and designating the sum as the updated correction coefficient.

In some embodiments, the correction coefficient of the first frame may include a CCM. The CCM may be a 3×3 matrix. For example, the CCM may include matrix elements as shown in Table 1.

TABLE 1

Matrix Elements of CCM

| RR | RG | RB |
|----|----|----|
| GR | GG | GB |
| BR | BG | BB |

In the CCM, the RR, the GG, and the BB may be diagonal matrix elements, and regarded as key matrix elements in the CCM.

Therefore, the processing device 120 may adjust the CCM by adjusting values of the RR, the GG, and the BB based on the adjustment coefficient. For example, the processing device 120 may adjust the values of the RR, the GG, and the BB by multiplying the values of the RR, the GG, and the BB by the adjustment coefficient, respectively. Taking the RR as an example, the processing device 120 may obtain a new value of the RR by multiplying the value of the RR by the adjustment coefficient, and replacing the value of the RR in the CCM with the new value of the RR. In some embodiments, the processing device 120 may further adjust other matrix elements in the CCM. Since a sum of the values of the matrix elements in each row of the CCM is a fixed value, the processing device 120 may determine configuration coefficients of the other matrix elements in each row, and adjust values of the other matrix elements based on the configuration coefficients. For example, by performing a matrix normalization on the CCM, the sum of the values of the matrix elements in each row of the CCM may be 1. That is, a sum of values of the RR, the RG, and the RB may be 1; a sum of values of the GR, the GG, and the GB may be 1; and a sum of values of the BR, the BG, and the BB may be 1. The processing device 120 may determine the configuration coefficients of the other matrix elements in each row, and adjust the values of the other matrix elements based on the configuration coefficients as shown in Table 2.

TABLE 2

Adjusted Matrix Elements of CCM

| RR × coff | RG | 1 − (RR × coff + RG) |
|-----------|-----|---------------------|
| 1 − (GG × coff + GB) | GG × coff | GB |
| BR | 1 − (BB × coff + BR) | BB × coff |

In Table 2, coff may represent the adjustment coefficient. The values of the RG, the GB, and the BR may be unchanged. Correspondingly, the value of the RB may be adjusted to 1−(RR×coff+RG), the value of the GR may be adjusted to 1−(GG×coff+GB), and the value of the BG may be adjusted to 1−(BB×coff+BR).

It should be noted that the description of the adjustment of the CCM is provided for the purposes of illustration, and not intended to limit the scope of the present disclosure. For example, the values of the RB, the GR, and the BG may be unchanged. Correspondingly, the value of the RG may be adjusted to 1−(RR×coff+RB), the value of the GB may be adjusted to 1−(GG×coff+GR), and the value of the BR may be adjusted to 1−(BB×coff+BG). As another example, the adjustment coefficient may be used to adjust the values of the other matrix elements.

In some embodiments, the processing device 120 may correct the first frame based on the adjusted correction coefficient. For example, the processing device 120 may correct the first frame based on the adjusted CCM as shown in Table 2. Specifically, the processing device 120 may correct the first frame by obtaining a product of statistical values of GRB channels of the first frame and the adjusted CCM according to Equation (4) as below:

$$\begin{bmatrix} R' \\ G' \\ B' \end{bmatrix} = \begin{bmatrix} RR \times coff & RG & 1-(RR \times coff + RG) \\ 1-(GG \times coff + GB) & GG \times coff & GB \\ BR & 1-(BB \times coff + BR) & BB \times coff \end{bmatrix} \times \begin{bmatrix} R' \\ G' \\ B' \end{bmatrix}; \quad (4)$$

$$\text{where} \begin{bmatrix} RR \times coff & RG & 1-(RR \times coff + RG) \\ 1-(GG \times coff + GB) & GG \times coff & GB \\ BR & 1-(BB \times coff + BR) & BB \times coff \end{bmatrix}$$

may represent the adjusted CCM, R may represent the statistical value of the red channel of the first frame, G may represent the statistical value of the green channel, B may represent the statistical value of the blue channel, R' may represent the updated statistical value of the red channel, G' may represent the updated statistical value of the green channel, and B' may represent the updated statistical value of the blue channel.

Some embodiments of the present disclosure, in response to determining that the gamma curve of the image acquisition device has been adjusted, the adjustment coefficient of the correction coefficient may be determined based on the first frame and the second frame, and the correction coefficient of the first frame may be further adjusted based on the adjustment coefficient. Therefore, the adjustment of the gamma curve may be considered during the image correction, which may reduce or eliminate the color distortion caused by the adjustment of the gamma curve, thereby improving the accuracy of the colors in the first image.

It should be noted that the description of the process 400 is provided for the purposes of illustration, and not intended to limit the scope of the present disclosure. For persons having ordinary skills in the art, various variations and modifications may be conducted under the teaching of the present disclosure. However, those variations and modifications may not depart from the protection of the present disclosure.

For example, before operation 402, a corresponding relationship between an original gamma curve, a plurality of color temperatures, a plurality of values of the at least one feature parameter (e.g., the saturation, the hue, etc.), and a plurality of correction coefficients may be obtained. Merely by way of example, an exemplary fourth corresponding relationship corresponding to a first gamma curve may be shown in Table 3.

TABLE 3

| | Fourth Corresponding Relationship | | |
|---|---|---|---|
| Orignal Gamma Curve | Color Temperature T1 | CCM1 | Saturation S1 |
| | Color Temperature T2 | CCM2 | Saturation S2 |
| | Color Temperature T2 | CCM3 | Saturation S3 |
| | ... | ... | ... |

In some embodiments, the first color temperature of the first frame may be determined, and a CCM value and a saturation value corresponding to the first frame may be determined by looking up the Table 3. In some embodiments, the second corresponding relationship and the third corresponding relationship may be determined based on the fourth corresponding relationship.

As another example, after operation 402 and before operation 404, the processing device 120 may determine whether areas of monochrome portions in the first frame exceed an area threshold and whether a third difference between the first color temperature and the second color temperature exceeds a color temperature threshold.

Figure 5:
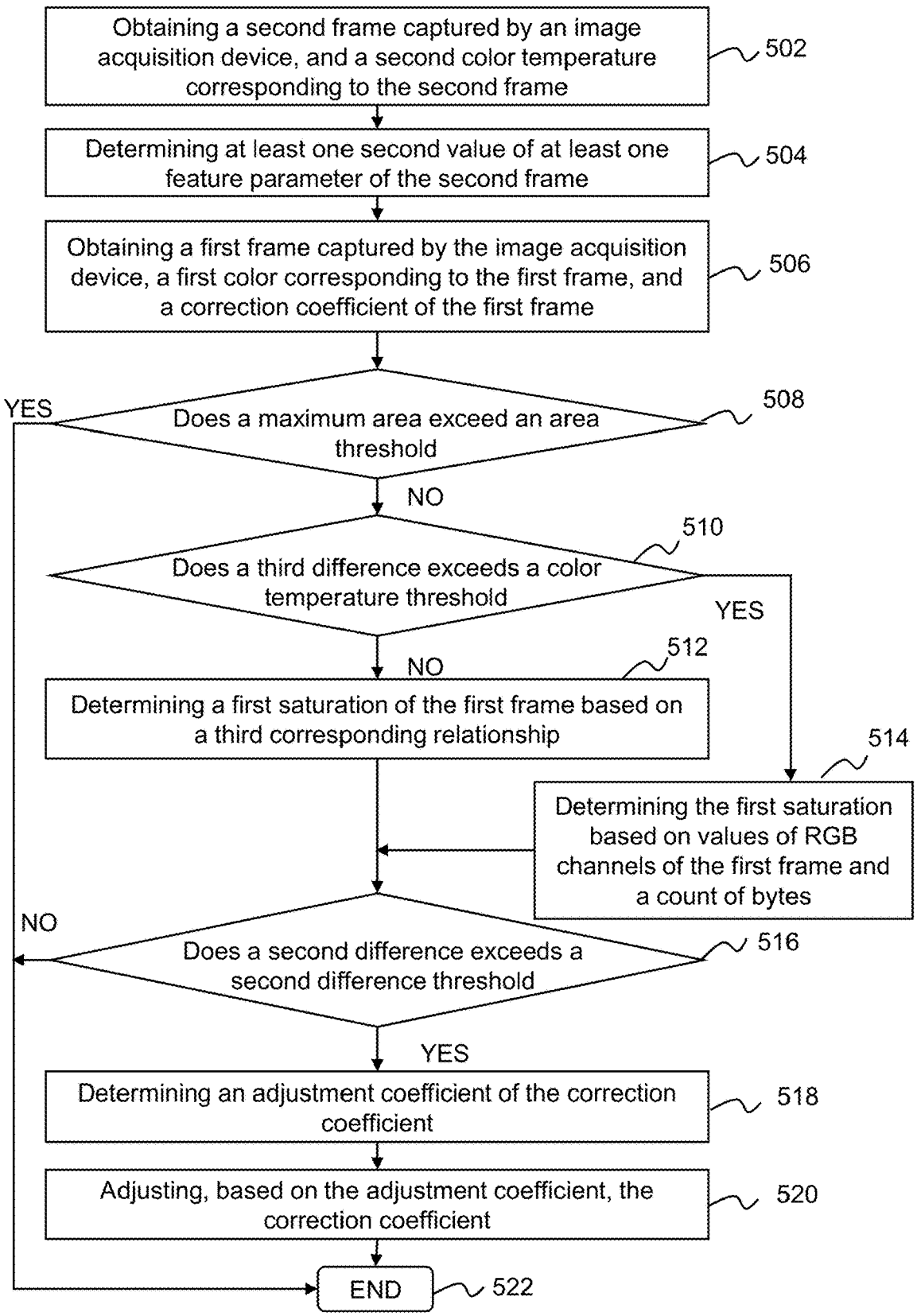
FIG. 5 is a flowchart illustrating another exemplary process for adjusting a correction coefficient according to some embodiments of the present disclosure.

FIG. 5 is a flowchart illustrating another exemplary process 500 for adjusting a correction coefficient according to some embodiments of the present disclosure. The process 500 may be an exemplary embodiment of the process 400 as described in connection with FIG. 4.

In 502, the processing device 120 (e.g., the obtaining module 302) may obtain a second frame (e.g., a preliminary frame) captured by an image acquisition device (e.g., the image acquisition device 110) and a second color temperature (e.g., a preliminary color temperature) corresponding to the second frame.

In 504, the processing device 120 (e.g., the determination module 304) may determine at least one second value of at least one feature parameter (e.g., a saturation, a hue, etc.) of the second frame. For example, the processing device 120 may determine a second saturation of the second frame based on the third corresponding relationship between reference color temperatures and reference values of the saturation.

In 506, the processing device 120 (e.g., the obtaining module 302) may obtain a first frame (e.g., a current frame) captured by the image acquisition device (e.g., the image acquisition device 110), a first color temperature (e.g., a current color temperature) corresponding to the first frame, and a correction coefficient of the first frame. In some embodiments, the processing device 120 may determine the correction coefficient of the first frame based on the first color temperature and the second corresponding relationship between reference color temperatures and reference correction coefficients.

In 508, the processing device 120 (e.g., the determination module 304) may determine areas of monochrome portions in the first frame, and determine whether a maximum area among the areas exceeds an area threshold. In some embodiments, the processing device 120 may obtain the monochrome portions and the areas based on an image recognition technique, an image segmentation technique, etc. In some embodiments, the area threshold may be determined based on the system default setting, or set manually by a user, or determined according to an actual need. For example, the area threshold may be a certain percentage (e.g., 50%, 60%, 70%, 80%, 90%, 95%, etc.) of the total area of the first frame. In some embodiments, the processing device 120 may determine whether the maximum area among the areas exceeds the area threshold.

If the maximum area among the areas exceeds the area threshold, the process 500 may proceed to operation 522. In 522, the processing device 120 may terminate the process 500.

If the maximum area among the areas doesn't exceed the area threshold, the process 500 may proceed to operation 510. In 510, the processing device 120 (e.g., the determination module 304) may determine whether a difference (also referred to as the third difference) between the first color temperature corresponding to the first frame and the second color temperature corresponding to the second frame exceeds a color temperature threshold. In some embodiments, the color temperature threshold may be determined based on the system default setting, or set manually by the user, or determined according to the actual need. For example, the color temperature threshold may include 100 K, 200 K, 300K, 500 K, 800 K, 1000K, 2000 K, 3000 K, etc.

If the third difference between the first color temperature and the second color temperature doesn't exceed the color temperature threshold, the process 500 may proceed to operation 512. In 512, the processing device 120 (e.g., the determination module 304) may determine a first saturation of the first frame based on the third corresponding relationship.

If the third difference between the first color temperature and the second color temperature exceeds the color temperature threshold, the process 500 may proceed to operation 514. In 514, the processing device 120 (e.g., the determination module 304) may determine the first saturation of the first frame based on values of RGB channels of the first frame and a count of bytes representing a size of the first frame.

In 516, the processing device 120 (e.g., the determination module 304) may determine whether a difference (also referred to as the second difference) between the first saturation and the second saturation exceeds a difference threshold (also referred to as the second difference threshold).

If the second difference doesn't exceed the second difference threshold, the process 500 may proceed to operation 522. In 522, the processing device 120 may terminate the process 500.

If the second difference exceeds the second difference threshold, the process 500 may proceed to operation 518. In 518, the processing device 120 may determine an adjustment coefficient of the correction coefficient based on the first value and the second value. Merely by way of example, the processing device 120 may determine a ratio of the first saturation of the first frame to the second saturation of the second frame, and designate the ratio as the adjustment coefficient of the correction coefficient.

In 520, the processing device 120 (e.g., the adjustment module 306) may adjust, based on the adjustment coefficient, the correction coefficient of the first frame.

It should be noted that the description of the process 500 is provided for the purposes of illustration, and not intended to limit the scope of the present disclosure. For persons having ordinary skills in the art, various variations and modifications may be conducted under the teaching of the present disclosure. However, those variations and modifications may not depart from the protection of the present disclosure. For example, before operation 502, a corresponding relationship between an original gamma curve, a plurality of color temperatures, a plurality of values of the at least one feature parameter (e.g., the saturation, the hue, etc.), and a plurality of correction coefficients may be obtained.

Figure 6:
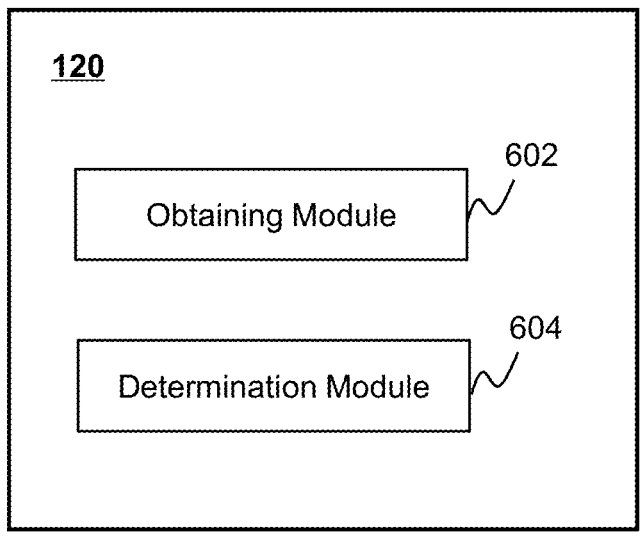
FIG. 6 is a block diagram illustrating an exemplary processing device according to some embodiments of the present disclosure.

FIG. 6 is a block diagram illustrating an exemplary processing device 120 according to some embodiments of the present disclosure. In some embodiments, the processing device 120 may be in communication with a computer-readable storage medium (e.g., the storage device 130 illustrated in FIG. 1) and may execute instructions stored in the computer-readable storage medium. The processing device 120 may include an obtaining module 602 and a determination module 604.

The obtaining module 602 may be configured to obtain a target frame captured by an image acquisition device under a color temperature. The target frame may refer to a frame configured to determine a correction coefficient corresponding to the color temperature. More descriptions regarding the obtaining of the target frame may be found elsewhere in the present disclosure. See, e.g., operation 702 and relevant descriptions thereof.

The determination module 604 may be configured to determine, based on the color temperature, reference color information of the target frame in a reference color space. The reference color information may refer to color information (e.g., the descriptions of colors) of the target frame in the reference color space. More descriptions regarding the determination of the reference color information may be found elsewhere in the present disclosure. See, e.g., operation 704 and relevant descriptions thereof.

The determination module 604 may be further configured to determine, based on the reference color information, a correction coefficient corresponding to the color temperature for correcting the target frame. The correction coefficient may be configured to correct the target frame (e.g., colors of the target frame), thereby reducing or eliminating the color distortion. In some embodiments, the correction coefficient includes a CCM. More descriptions regarding the determination of the correction coefficient may be found elsewhere in the present disclosure. See, e.g., operation 706 and relevant descriptions thereof.

It should be noted that the above descriptions of the processing device 120 are provided for the purposes of illustration, and not intended to limit the scope of the present disclosure. For persons having ordinary skills in the art, various variations and modifications may be conducted under the guidance of the present disclosure. However, those variations and modifications do not depart from the scope of the present disclosure. In some embodiments, the processing device 120 may include one or more other modules. For example, the processing device 120 may include a storage module to store data generated by the modules in the processing device 120. In some embodiments, any two of the modules may be combined as a single module, and any one of the modules may be divided into two or more units. In some embodiments, two or more modules of the processing device 120 shown in FIG. 3 and FIG. 6 may be integrated into one module. For example, the obtaining module 302 and the obtaining module 602 may be integrated into one module.

Figure 7:
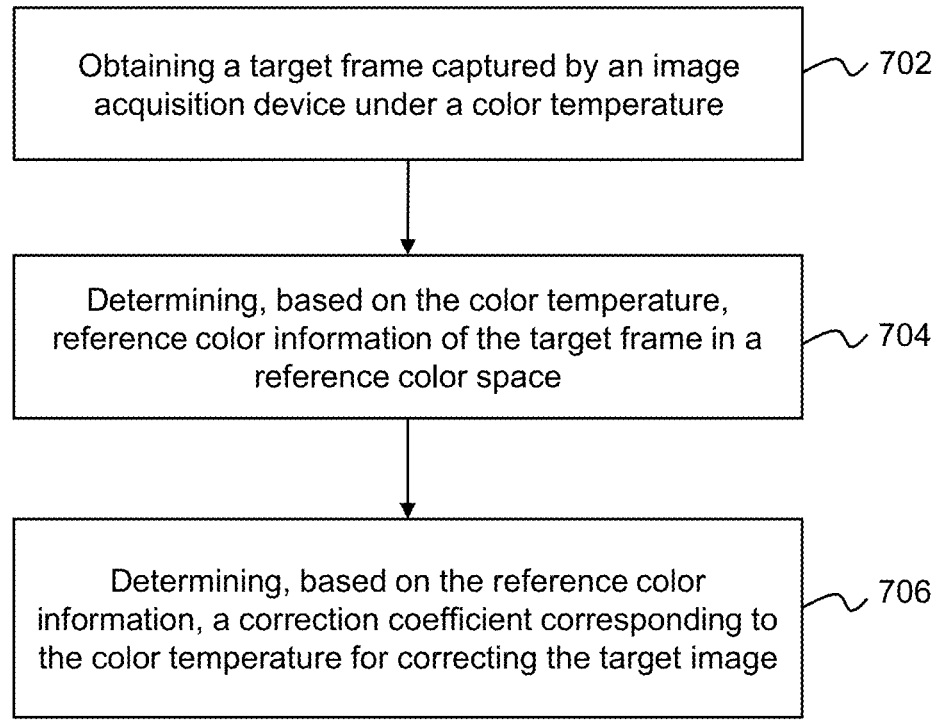
FIG. 7 is a flowchart illustrating an exemplary process for determining a correction coefficient corresponding to a color temperature according to some embodiments of the present disclosure.

FIG. 7 is a flowchart illustrating an exemplary process for determining a correction coefficient corresponding to a color temperature according to some embodiments of the present disclosure.

As aforementioned, a correction coefficient (e.g., a color correction matrix (CCM)) may be used to perform the image correction. Merely by way of example, a set of CCMs may be calibrated in advance at different color temperatures (e.g., a high color temperature, a medium color temperature, and a low color temperature), and a target CCM for correcting a certain frame may be determined based on the set of CCMs and an estimated color temperature of the certain frame. However, in actual use, the correction coefficient may be calibrated based on differences between colors in an image of a scene captured by an image acquisition device and colors of the scene perceived by human eyes, wherein the differences are determined by human eyes of a user. For example, the user may subjectively determine the differences, and adjust matrix elements in the CCM based on the differences until the user determines that the colors in the image captured by the image acquisition device are consistent with the colors of the scene perceived by himself. Therefore, the determination of the correction coefficient may be susceptible to human error or subjectivity and inefficient.

Therefore, methods for determining the correction coefficient automatically are provided in the present discourse. Compared with the conventional methods for determining the correction coefficient, the methods disclosed herein may be more reliable and robust, insusceptible to human error or subjectivity, and/or fully automated. Specifically, the processing device 120 of the image correction system 100 may perform the process 700 to determine the correction coefficient corresponding to a color temperature.

In 702, the processing device 120 (e.g., the obtaining module 602) may obtain a target frame captured by an image acquisition device under a color temperature.

The target frame may refer to a frame configured to determine a correction coefficient corresponding to the color temperature. The obtaining of the target frame may be similar to the obtaining of a first frame and/or a second frame as described in FIG. 4. In some embodiments, the target frame may also be referred to as a reference frame.

A color temperature corresponding to a frame may refer to a temperature of an ideal black-body radiator that radiates light of a color comparable to that of a light source when the frame is captured. In some embodiments, the color temperature may be a measurement unit that indicates color components contained in the light. For example, the color temperature of the image acquisition device may be the ambient temperature of the image acquisition device or the color temperature corresponding to the image captured by the image acquisition device. The determination of the color temperature may be similar to the determination of a first color temperature as described in FIG. 4.

In 704, the processing device 120 (e.g., the determination module 604) may determine, based on the color temperature, reference color information of the target frame in a reference color space.

Color space may refer to a specific organization of colors for quantitatively representing colors. Exemplary color spaces may include a red-green-blue (RGB) color space, a CIE 1931 XYZ color space (also referred to as XYZ color space), a CIRLAB color space (also referred to as Lab color space), a cyan-magenta-yellow-key (CMYK) color space, etc.

The RGB color space may refer to a color space that represents a specific color with a red component, a green component, and a blue component. Correspondingly, color information of a frame in the RGB color space may include RGB data (e.g., the red component, the green component, and the blue component) of each color in the frame. In some embodiments, the image acquisition device (e.g., the image acquisition device 110) may use the RGB color space to encode the colors.

The XYZ color space may refer to a color space that represents a specific color with an X component, a Y component, and a Z component. Color may be represented in a three-dimensional coordinate system corresponding to the XYZ color space. Correspondingly, color information of a frame in the XYZ color space may include XYZ data (e.g., the X component, the Y component, and the Z component) of each color in the frame. Since the XYZ color space is defined mathematically, a transformation relationship between the XYZ color space and another color space (e.g., the RGB color space, the Lab color space, etc.) may be easily and accurately determined. In some embodiments, the XYZ color space may be used as an intermediate color space. For example, color information of a frame in the RGB color space may not be directly transformed into color information of the frame in the Lab color space. The color information of the frame in the RGB color space may be transformed into color information of the frame in the XYZ color space, and then the color information of the frame in the XYZ color space may be transformed into the color information of the frame in the Lab color space. That is, through the XYZ color space, the color information in the XYZ color space and the color information in the Lab color space may be transformed into each other.

The Lab color space may refer to a color space that is established based on human perception of colors. Color information of a frame in the Lab color space may include Lab data of each color in the frame, wherein L may represent the brightness, a may represent a component from green to red, and b may represent a component from blue to yellow. In addition, each channel in the lab color space may have a little correlation with other channels, and the Lab color space is device independent. That is, descriptions of colors in the Lab color space may not be affected by the image acquisition device. As long as a white point of the Lab color space is determined, the Lab color space may clearly determine that each color is created and displayed, which has nothing to do with the image acquisition device.

The CMYK color space may refer to a color space that describes a printing process.

In some embodiments, frames captured by the image acquisition device are represented in a target color space, e.g., the RGB color space. The processing device 120 may determine the reference color information of the target frame in the reference color space that is different from the target color space. For example, the reference color space may refer to a color space that is designed based on human perception of colors. Merely by way of example, since the Lab color space is established based on the human perception of colors, and each channel in the Lab color space has a little correlation with other channels, the Lab color space may be determined as the reference color space. By using the Lab space data as the reference color space, color deviation caused by different devices may be reduced.

The reference color information may refer to color information (e.g., the descriptions of colors) of the target frame in the reference color space. For example, if the reference color space is the Lab color space, the reference color information may include Lab data corresponding to colors in the target frame.

In some embodiments, the processing device 120 may obtain color information of the target frame in the target color space, such as the RGB color space. The processing device 120 may obtain a transformation relationship between the target color space and the reference color space based on the color temperature. Further, the processing device 120 may determine the reference color information of the target frame in the reference color space based on the transformation relationship. More descriptions regarding the determination of the reference color information may be found elsewhere in the present disclosure (e.g., FIG. 8 and the descriptions thereof).

In 706, the processing device 120 (e.g., the determination module 604) may determine, based on the reference color information, a correction coefficient corresponding to the color temperature for correcting the target frame.

The correction coefficient may be configured to correct the target frame (e.g., colors of the target frame), thereby reducing or eliminating the color distortion. In some embodiments, the correction coefficient includes a CCM.

In some embodiments, the processing device 120 may determine, a target color matrix based on the reference color information. The processing device 120 may determine a source color matrix based on the target frame. Further, the processing device 120 may determine the correction coefficient corresponding to the color temperature based on the target color matrix and the source color matrix. More descriptions regarding the determination of the correction coefficient may be found elsewhere in the present disclosure (e.g., FIG. 9 and the descriptions thereof).

In some embodiments, the processing device 120 may further process the correction coefficient. Merely by way of example, the processing device 120 may adjust the correction coefficient based on a gamma curve of the image acquisition device. Specifically, the processing device 120 may obtain a first frame captured by the image acquisition device under the color temperature. The correction coefficient may correspond to the first frame. The processing device 120 may obtain a second frame captured by the image acquisition device prior to the first frame. The processing device 120 may also determine, based on the first frame and the second frame, whether the gamma curve of the image acquisition device has been adjusted. If the gamma curve of the image acquisition device has been adjusted, the processing device 120 may determine the adjustment coefficient of the correction coefficient based on the first frame and the second frame. Further, the processing device 120 may adjust, based on the adjustment coefficient, the correction coefficient. More descriptions regarding the adjustment of the correction coefficient may be found elsewhere in the present disclosure (e.g., FIGS. 4-5 and the descriptions thereof).

In some embodiments, process 700 may be performed multiple times to determine correction coefficients corresponding to different color temperatures. The determined correction coefficients corresponding to different color temperatures may be used to determine the second corresponding relationship between reference color temperatures and reference correction coefficients. Merely by way of example, the second corresponding relationship may be denoted as a corresponding table, and a determined correction coefficient and its corresponding color temperature may be recorded in a row in the corresponding table as a reference correction coefficient and its corresponding reference color.

Some embodiments of the present disclosure, the reference color information of the target frame in the reference color space may be determined, and the correction coefficient corresponding to the color temperature may be determined based on the reference color information. Since the reference color information of the target frame in the reference color space is designed based on human perception of colors, the determined correction coefficient may be more accurate, thereby improving the accuracy of image data acquired by the image acquisition device. In addition, the determination of the correction coefficient based on the reference color information may be automatic, which may not depend on a subjective determination by human eyes and the user experience and improve the accuracy and efficiency of the determination of the correction coefficient.

It should be noted that the description of the process 700 is provided for the purposes of illustration, and not intended to limit the scope of the present disclosure. For persons having ordinary skills in the art, various variations and modifications may be conducted under the teaching of the present disclosure. For example, after the correction coefficient is determined, the processing device 120 may perform the image correction based on the correction coefficient. As another example, the correction coefficient may be validated by a user. However, those variations and modifications may not depart from the protection of the present disclosure.

Figure 8:
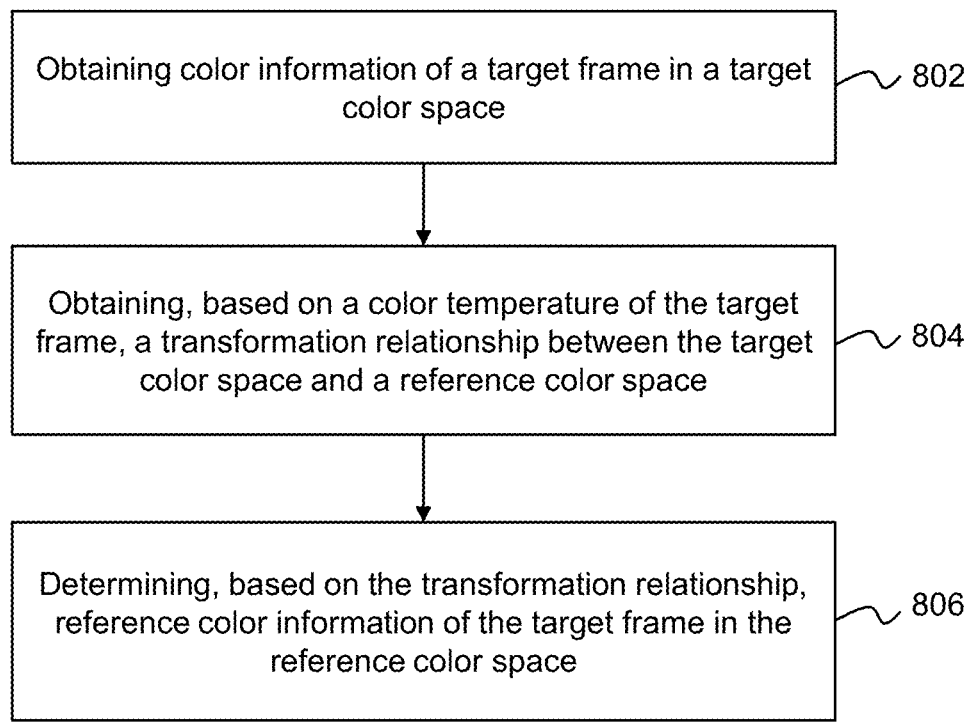
FIG. 8 is a flowchart illustrating an exemplary process for determining reference color information according to some embodiments of the present disclosure.

FIG. 8 is a flowchart illustrating an exemplary process for determining reference color information according to some embodiments of the present disclosure. In some embodiments, the process 800 may be performed to achieve at least part of operation 704 as described in connection with FIG. 7.

In 802, the processing device 120 (e.g., the determination module 604) may obtain color information of a target frame in a target color space.

The target color space may refer to a color space corresponding to an image acquisition device. For example, for the image acquisition device 110, the target color space may be an RGB color space. The color information of the target frame may include RGB data (e.g., the red component, the green component, and the blue component) of the target frame.

In some embodiments, the target frame may include the color information. Therefore, when the target frame is obtained, the processing device 120 may obtain the color information of the target frame in the target color space. Alternatively, the color information of the target frame in the target color space may be obtained by the processing device 120 by analyzing the target frame. For example, the processing device 120 may process the target frame based on a color recognition technique to obtain the color information of the target frame in the target color space. Exemplary color recognition techniques may include a linear color threshold technique, a nearest neighbor technique, a threshold vector technique, or the like, or any combination thereof.

In 804, the processing device 120 (e.g., the determination module 604) may obtain, based on a color temperature of the target frame, a transformation relationship between the target color space and a reference color space.

The transformation relationship may be used to perform a transformation between the color information of the target frame in the target color space and the reference color information of the target frame in the reference color space. For example, if the reference color space is the Lab color space and the target color space is the RGB color space, the RGB data of the target frame and Lab data of the target frame may be transformed into each other based on the transformation relationship. Merely by way of example, the transformation relationship may include color information of a color in the target color space and the corresponding reference color information in the reference color space under a color temperature. The transformation relationship may be represented as a table, a diagram, a model, a mathematic function, or the like, or any combination thereof.

In some embodiments, the processing device 120 may obtain a plurality of candidate transformation relationships between the target color space and the reference color space. Each of the plurality of candidate transformation relationships may correspond to one of a plurality of candidate color temperatures. In some embodiments, each candidate transformation relationship may be determined based on experimental data acquired by the image acquisition device or another reference image acquisition device under different color temperatures. For example, a reference image acquisition device may be operated to capture color information of a standard color card or a color card set manually by a user under different color temperatures, and the captured color information may be used to determine the candidate transformation relationships corresponding to different color temperatures.

Merely by way of example, the reference color space is the Lab color space, the target color space is the RGB color space, and the plurality of candidate transformation relationships between the Lab color space and the RGB color space may be shown in Table 4.

TABLE 4

Candidate Transformation Relationships between
Lab Color Space and RGE Color Space

| Color Temperature | Red | | | Yellow | | | Blue | | |
|---|---|---|---|---|---|---|---|---|---|
| 2400 K | L00 | a00 | b00 | L01 | a01 | b01 | L02 | a02 | b02 |
| 4800 K | L10 | a10 | b10 | L11 | a11 | b11 | L12 | a12 | b12 |
| / | / | / | / | / | / | / | / | / | / |

The candidate transformation relationships in Table 4 may indicate standard Lab data of different RGB colors under different color temperatures, and the standard Lab data may be consistent with human eye characteristics. It should be noted that the descriptions of the candidate transformation relationships are provided for the purposes of illustration, and not intended to limit the scope of the present disclosure. For example, Table 4 may include any other color temperatures, such as, 1000 K, 2000 K, 3000 K, etc. As another example, Table 4 may include Lab data corresponding to any other colors, such as, green, purple, etc.

In some embodiments, the processing device 120 may determine, based on the color temperature and the plurality of candidate transformation relationships, the transformation relationship between the target color space and the reference color space. For example, if the color temperature is 2400 K, a candidate transformation relationship corresponding to 2400 K may be determined as the transformation relationship. Taking Table 4 as an example, if the color temperature is 2400 K, the first line of Table 4 may be determined as the transformation relationship. If the color temperature is 4800 K, the second line of Table 4 may be determined as the transformation relationship.

In 806, the processing device 120 (e.g., the determination module 604) may determine, based on the transformation relationship, the reference color information of the target frame in the reference color space.

Merely by way of example, if the color information of the target frame in the target color space includes red and yellow, and the color temperature is 2400 K, the processing device 120 may determine Lab (L00, a00, b00) and Lab (L01, a01, b01) as the reference color information according to the first row in Table 4. If the color information of the target frame in the target color space includes red and blue, and the color temperature is 4800 K, the processing device 120 may determine Lab (L10, a10, b10) and Lab (L12, a12, b12) as the reference color information according to the second row in Table 4.

In some embodiments, the processing device 120 may determine the reference color information of the target frame in the reference color space directly the color temperature and the plurality of candidate transformation relationships. Taking Table 4 as an example, the processing device 120 may determine the reference color information of the target frame in the reference color space by looking up Table 4 based on the color information of the target frame in the target color space and the color temperature corresponding to the target frame. For example, if the color information of the target frame in the target color space includes red and yellow, and the color temperature is 2400 K, the processing device 120 may determine Lab (L00, a00, b00) and Lab (L01, a01, b01) as the reference color information by looking up Table 4. If the color information of the target frame in the target color space includes red and blue, and the color temperature is 4800 K, the processing device 120 may determine Lab (L10, a10, b10) and Lab (L12, a12, b12) as the reference color information by looking up Table 4.

In some embodiments of the present disclosure, the reference color information of the target frame in the reference color space, such as Lab data in the Lab color space, may be determined and serve as a basis for determining the correction coefficient of the target frame. The Lab data may be device independent, and the Lab color space may be used to determine how colors will be displayed or set without considering the display medium of the colors. Therefore, using the Lab data as the reference color information may improve the accuracy of the reference color information reducing data error caused by device differences, which, in turn, improves the accuracy and efficiency of the determination of the correction coefficient.

It should be noted that the description of the process 800 is provided for the purposes of illustration, and not intended to limit the scope of the present disclosure. For persons having ordinary skills in the art, various variations and modifications may be conducted under the teaching of the present disclosure. However, those variations and modifications may not depart from the protection of the present disclosure.

Figure 9:
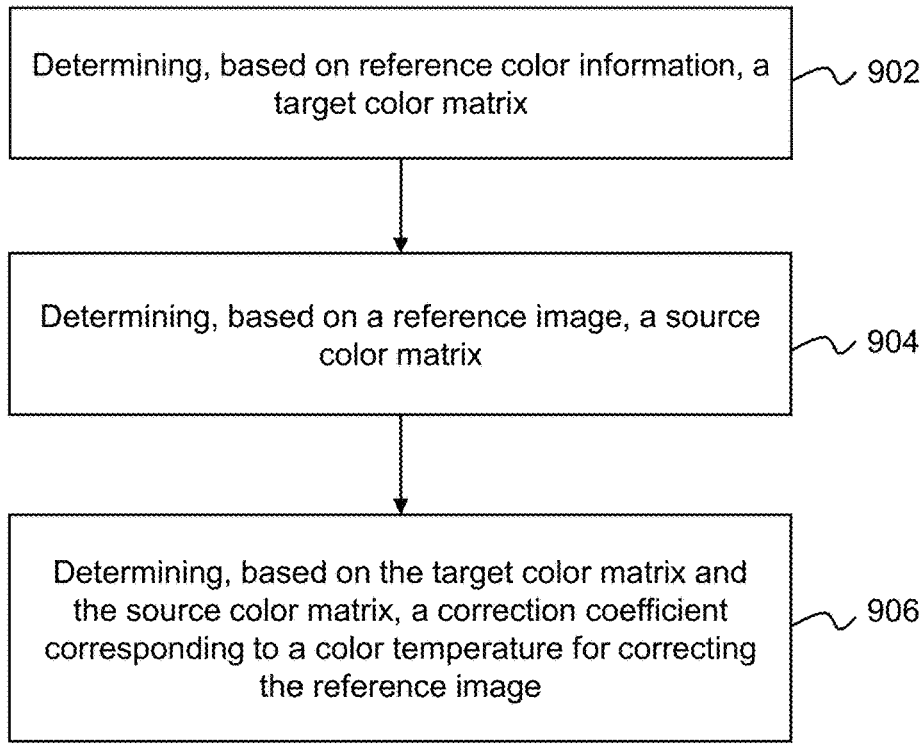
FIG. 9 is a flowchart illustrating an exemplary process for determining a correction coefficient according to some embodiments of the present disclosure.

FIG. 9 is a flowchart illustrating an exemplary process for determining a correction coefficient according to some embodiments of the present disclosure. In some embodiments, the process 800 may be performed to achieve at least part of operation 706 as described in connection with FIG. 7.

In 902, the processing device 120 (e.g., the determination module 604) may determine, based on reference color information, a target color matrix.

The target color matrix may refer to a color matrix representing the reference color information in a target color space.

In some embodiments, the processing device 120 may transform the reference color information into target color information in the target color space. For example, if the target color space is the RGB color space, and a reference color space is the Lab color space, the Lab data (i.e., the reference color information) of the target frame may be transformed into RGB data (i.e., the target color information).

Since the Lab data cannot be directly transformed into the RGB data, the XYZ color space may be used as an intermediate color space. Specifically, the processing device 120 may transform the Lab data into XYZ data, wherein the XYZ data includes color information of each color in the target frame in the XYZ color space. In some embodiments, the Lab data may be transformed into the XYZ data according to a transformation process. The transformation process may include defining $f_y$, $f_x$, and $f_z$ according to Equation (5) as below:

$$\begin{cases} f_y = (L^* + 16)/116 \\ f_x = f_y + a^*/500 \\ f_z = f_y - b^*/200 \end{cases} \quad (5)$$

where L* may represent a matrix corresponding to the brightness, a* may represent a matrix corresponding to a component from green to red, and b* may represent a matrix corresponding to a component from blue to yellow.

The transformation process may also include comparing $f_y$, $f_x$, and $f_z$ with δ, respectively, wherein δ is 6/29. If $f_y$ is larger than δ, a Y component of the XYZ data may be determined according to Equation (6) as below:

$$Y = Y_n f_y^3, \quad (6)$$

where Y may represent the Y component of the XYZ data, and $Y_n$ may represent the Y component of a reference white point.

If $f_y$ is less or equal to than δ, the Y component of XYZ data may be determined according to Equation (7) as below:

$$Y = (f_y - 16/116) \times 3\delta^2 Y_n. \quad (7)$$

Similarly, if $f_x$ is larger than δ, an X component of the XYZ data may be determined according to Equation (8) as below:

$$X = X_n f_x^3, \quad (8)$$

where X may represent the X component of the XYZ data, and $X_n$ may represent an X component of the reference white point.

If $f_x$ is less or equal to than δ, the X component of the XYZ data may be determined according to Equation (9) as below:

$$X = (f_x - 16/116) \times 3\delta^2 X_n. \quad (9)$$

If $f_z$ is larger than δ, a Z component of the XYZ data may be determined according to Equation (10) as below:

$$Z = Z_n f_z^3, \quad (10)$$

where Z may represent the Z component of the XYZ data, and $Z_n$ may represent a Z component of the reference white point.

If $f_z$ is less or equal to than δ, the Z component of the XYZ data may be determined according to Equation (11) as below:

$$Z = (f_z - 16/116) \times 3\delta^2 Z_n. \quad (11)$$

In some embodiments, the processing device 120 may further process the XYZ data. For example, the processing device 120 may perform a correction operation on the XYZ data.

The processing device 120 may further transform the processed XYZ data into the RGB data. For example, the processing device 120 may transform the processed XYZ data into the RGB data according to Equation (12) as below:

$$\begin{cases} R = (X \times 3229543 - Y \times 1611819 - Z \times 569148) \gg 20 \\ G = (-X \times 965985 - Y \times 1967119 + Z \times 47422) \gg 20 \\ B = (X \times 55460 - Y \times 213955 + Z \times 1207070) \gg 20 \end{cases} \quad (12)$$

Figure 10:
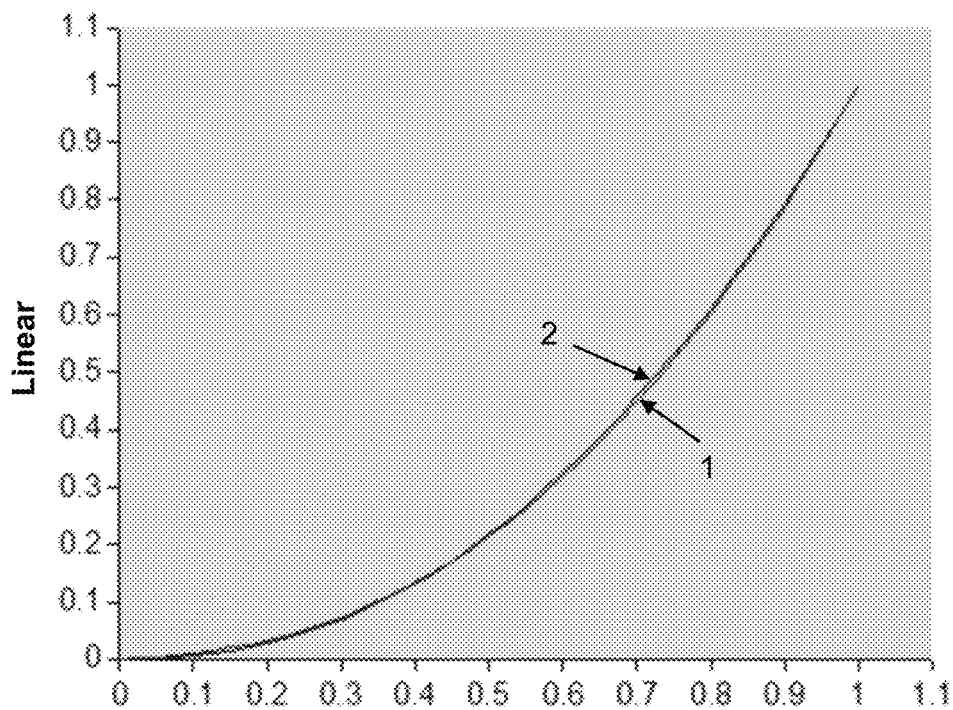
FIG. 10 is a schematic diagram illustrating an sRGB standard and a gamma curve according to some embodiments of the present disclosure.

In some embodiments, the processing device 120 may determine the target color matrix based on the target color information. For example, the processing device 120 may perform an inverse operation of an sRGB standard operation on the RGB data to obtain the target color matrix, wherein the sRGB standard is a universal color standard. Normally, when the image acquisition device is used to display Lab data, the Lab data may be subjected to a gamma module of the image acquisition device, and also subjected to an sRGB standard operation and then be displayed. The Gamma module may transform the brightness corresponding to the original Lab data into a first brightness by looking up a gamma curve, and the sRGB standard operation may be used to transform the first brightness into a second brightness by looking up an sRGB standard curve (e.g., a Gamma 2.2 curve). Merely by way of example, an sRGB standard curve (represented by curve 1) and a gamma curve (represented by curve 2) are shown in FIG. 10.

Therefore, after the Lab data is transformed into the RGB data, the inverse operation of the sRGB standard operation may be performed on the RGB data to obtain the target color matrix. Since the curve 1 is similar to the curve 2, the inverse operation of the sRGB standard may be similar to an inverse operation of the gamma operation. For example, the sRGB standard operation may be performed based on a two-dimensional table of the gamma 2.2 standard curve. The inverse operation may include regarding the RGB data (e.g., three values corresponding to RGB channels) as vertical coordinates of the two-dimensional table, and determining corresponding abscissas of the vertical coordinates. Further, the target color matrix may be determined based on the corresponding abscissas.

In 904, the processing device 120 (e.g., the determination module 604) may determine, based on the target frame, a source color matrix.

The source color matrix may refer to a color matrix representing the color information of the target frame in a target color space (e.g., the RGB color space).

In some embodiments, the processing device 120 may obtain a gamma curve utilized by the image acquisition device when the target frame is captured. In some embodiments, the gamma curve may be represented as a two-dimensional table, wherein the abscissa of the two-dimensional table is an input value (e.g., an inputted brightness), and the vertical coordinate of the two-dimensional table is an output value (e.g., an output brightness). For example, the processing device 120 may obtain the gamma curve from the image acquisition device when the target frame is captured. Merely by way of example, a plurality of gamma curves corresponding to different scenes (e.g., enhancements) may be stored in the image acquisition device, and the processing device 120 may determine the gamma curve based on the corresponding scene of the target frame. In some embodiments, if an enhancement is within a range between two reference enhancements stored in the image acquisition device and is different from each of the two reference enhancements, the gamma curve may be determined by performing an interpolation operation. For instance, if the enhancement is 5.5 that is between two reference enhancements 5 and 6, the gamma curve may be determined by performing the interpolation operation on a gamma curve of the enhancement corresponding to 5 and a gamma curve of the enhancement corresponding to 6.

In some embodiments, the processing device 120 may determine the source color matrix based on the target frame and the gamma curve. Merely by way of example, the processing device 120 may detect colors appeared in the target frame. For each color, the processing device 120 and determine average values of RGB channels of areas in the target frame that are in the color. For instance, if the target frame includes red and an upper left area of the target frame is red, the processing device 120 may obtain values of RGB channels of pixels in the upper left area, and determine average values of the RGB channels of the upper left area. The processing device 120 may input the average values of the RGB channels into the gamma curve, and obtain the source color matrix. For example, for red, a first average value of the R channel, a second average value of the G channel, and a third average value of the B channel of the upper left area may be determined. The processing device 120 may determine output values corresponding to the first, second, and third average values based on the gamma curve. The output values may be used to determine the source color matrix.

In some embodiments, each of the source color matrix and the target color matrix may be a matrix including a plurality of three-dimensional arrays, wherein each of the plurality of three-dimensional arrays may correspond to one color in the target frame. A count (or number) of the plurality of three-dimensional arrays in the source color matrix may be the same as a count (or number) of the plurality of three-dimensional arrays the target color matrix. The count (or number) of the plurality of three-dimensional arrays in the source color matrix and/or the target color matrix may be determined based on a count (or number) of colors in the target frame. In some embodiments, the source color matrix and/or the target color matrix may be represented in the form as shown in Table 5.

TABLE 5

| Color Matrix | | |
|---|---|---|
| R1 | G1 | B1 |
| R2 | G2 | B2 |
| R3 | G3 | B3 |
| R4 | G4 | B4 |
| / | / | / |

In 906, the processing device 120 (e.g., the determination module 604) may determine, based on the target color matrix and the source color matrix, a correction coefficient corresponding to a color temperature for correcting the target frame.

For example, the processing device 120 may determine a difference between the target color matrix and the source color matrix, and designate the difference as the correction coefficient corresponding to the color temperature. As another example, the processing device 120 may determine a ratio of the target color matrix to the source color matrix, and designate the ratio as the correction coefficient corresponding to the color temperature.

In some embodiments, the correction coefficient may include a CCM. The processing device 120 may determine an initial CCM based on the target color matrix and the source color matrix. For example, the processing device 120 may perform a matrix operation on the target color matrix and the source color matrix to obtain the initial CCM. Merely by way of example, the initial CCM may be determined according to Equation (13) as below:

$$\text{initial } CCM = \frac{\text{target color matrix}}{\text{source color matrix}}. \tag{13}$$

In some embodiments, the processing device 120 may determine the correction coefficient (e.g., the CCM) by processing the initial CCM, wherein the processing of the initial CCM may include a normalization operation. For example, if the initial CCM is $$\begin{bmatrix} c00 & c01 & c02 \\ c10 & c11 & c12 \\ c20 & c21 & c22 \end{bmatrix},$$

the normalization operation of the initial CCM may be performed according to Equation (14) as below:

$$\begin{cases} c02 = 1 - c00 - c01 \\ c12 = 1 - c10 - c11 \\ c22 = 1 - c20 - c21 \end{cases} \tag{14}$$

By performing the normalization operation on the initial CCM, the normality of the determined correction coefficient may be improved.

In some embodiments of the present disclosure, the target color matrix and the source color matrix may be determined, and the correction coefficient may be determined based on the target color matrix and the source color matrix. In some embodiments, the source color matrix may represent color information of a scene captured by the image acquisition device, the target color matrix may represent desired color information of the scene, and the correction coefficient may be used to correct the color information captured by the image acquisition device to reduce the deviation of the color information from the desired color information. Because the target color matrix is determined based on the Lab color space, which is established based on human perception of colors, the determined correction coefficient may enable that the corrected color information of the image acquisition device is more consistent with human eye characteristics.

It should be noted that the description of the process 900 is provided for the purposes of illustration, and not intended to limit the scope of the present disclosure. For persons having ordinary skills in the art, various variations and modifications may be conducted under the teaching of the present disclosure. However, those variations and modifications may not depart from the protection of the present disclosure.

Figure 11:
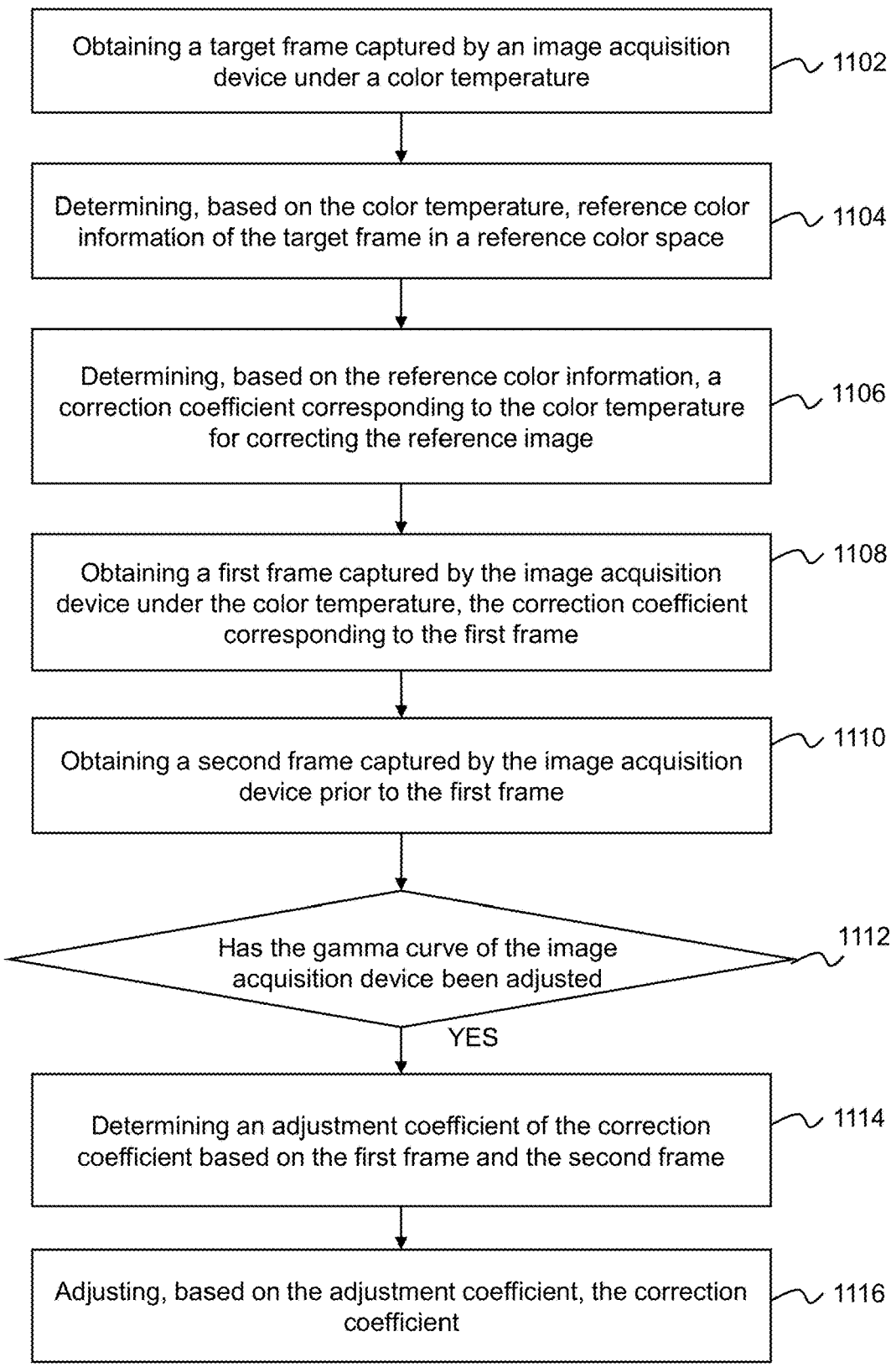
FIG. 11 is a flowchart illustrating an exemplary process for determining a correction coefficient according to some embodiments of the present disclosure.

FIG. 11 is a flowchart illustrating an exemplary process for determining a correction coefficient according to some embodiments of the present disclosure.

In 1102, the processing device 120 (e.g., the obtaining module 602) may obtain a target frame captured by an image acquisition device under a color temperature.

In 1104, the processing device 120 (e.g., the determination module 604) may determine, based on the color temperature, reference color information of the target frame in a reference color space.

In 1106, the processing device 120 (e.g., the determination module 604) may determine, based on the reference color information, a correction coefficient corresponding to the color temperature for correcting the target frame.

In 1108, the processing device 120 (e.g., the obtaining module 302) may obtain a first frame captured by the image acquisition device under the color temperature. The correction coefficient may correspond to the first frame.

In 1110, the processing device 120 may (e.g., the obtaining module 302) obtain a second frame captured by the image acquisition device prior to the first frame.

In 1112, the processing device 120 (e.g., the determination module 304) may determine, based on the first frame and the second frame, whether the gamma curve of the image acquisition device has been adjusted.

If the gamma curve of the image acquisition device has been adjusted, the processing device 120 (e.g., the determination module 304) may proceed to operation 1114. In 1114, the processing device 120 may determine the adjustment coefficient of the correction coefficient based on the first frame and the second frame.

In 1116, the processing device 120 (e.g., the adjustment module 306) may adjust, based on the adjustment coefficient, the correction coefficient.

It should be noted that the description of the process 1100 is provided for the purposes of illustration, and not intended to limit the scope of the present disclosure. For persons having ordinary skills in the art, various variations and modifications may be conducted under the teaching of the present disclosure. However, those variations and modifications may not depart from the protection of the present disclosure.

The above processes (e.g., the process 400, the process 500, the process 700, the process 800, the process 900, the process 1100) may be implemented in the image correction system 100 illustrated in FIG. 1. For example, the processes may be stored in the storage device 130 in the form of instructions (e.g., an application), and invoked and/or executed by the processing device 120 (e.g., the processing device 120 illustrated in FIG. 1, or one or more modules in the processing device 120 illustrated in FIG. 3, or one or more modules in the processing device 120 illustrated in FIG. 6). The operations of the illustrated process presented below are intended to be illustrative. In some embodiments, the processes may be accomplished with one or more additional operations not described, and/or without one or more of the operations discussed. Additionally, the order in which the operations of the processes (e.g., the process 400, the process 500, the process 700, the process 800, the process 900, the process 1100) as illustrated in the figures (e.g., FIGS. 4-5, FIGS. 7-9, FIG. 11) and described is not intended to be limiting.

Figure 12:
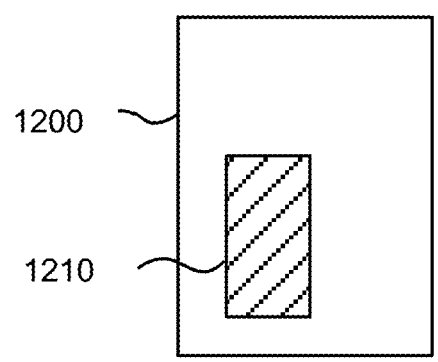
FIG. 12 is a schematic diagram illustrating an exemplary computer-readable medium according to some embodiments of the present disclosure.

FIG. 12 is a schematic diagram illustrating an exemplary computer-readable medium 1200 according to some embodiments of the present disclosure.

As illustrated in FIG. 12, the computer-readable medium 1200 may include a computer application 1210. When the computer application 1210 is executed by a processor, methods for image correction disclosed in the present disclosure may be implemented.

In some embodiments, if integrated units are implemented in the form of software functional units and sold or used as independent products, the integrated units may be stored in the computer-readable storage medium 1200. Therefore, the technical solution (or a portion of) in the present disclosure may be embodied in the form of a software product. The software product may be stored in the computer-readable storage medium 1200. The software product may include several instructions to cause a computer device (e.g., a personal computer, a server, a network device, etc.) or a processor to execute all or part of the methods for image correction disclosed in the present disclosure. The computer-readable storage medium 1200 may include a U disk, a mobile hard disk, a read-only memory (ROM), a random-access memory (RAM), a magnetic disk, an optical disk, or other media that can store program codes.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image correction implemented on a computing device having at least one processor and at least one storage device, the method comprising:
   obtaining a first frame captured by an image acquisition device, a second frame captured by the image acquisition device prior to the first frame, and a correction coefficient of the first frame;
   determining, based on the first frame and the second frame, whether a gamma curve of the image acquisition device has been adjusted;
   in response to determining that the gamma curve of the image acquisition device has been adjusted, determining an adjustment coefficient of the correction coefficient based on the first frame and the second frame; and
   adjusting, based on the adjustment coefficient, the correction coefficient of the first frame.

2. The method of claim 1, wherein the obtaining a correction coefficient of the first frame includes:
   determining a first color temperature corresponding to the first frame;
   obtaining a corresponding relationship between reference color temperatures and reference correction coefficients; and
   determining, based on the first color temperature and the corresponding relationship, the correction coefficient of the first frame.

3. The method of claim 2, wherein the obtaining a corresponding relationship between reference color temperatures and reference correction coefficients includes:
   for each reference color temperature,
      obtaining a reference frame captured by the image acquisition device under the reference color temperature;
      determining, based on the reference color temperature, reference color information of the reference frame in a reference color space; and
      determining, based on the reference color information, a reference correction coefficient corresponding to the reference color temperature for correcting the reference frame.

4. The method of claim 1, wherein the determining, based on the first frame and the second frame, whether a gamma curve of the image acquisition device has been adjusted includes:
   determining at least one first value of at least one feature parameter of the first frame;
   determining at least one second value of the at least one feature parameter of the second frame; and
   determining, based on the at least one first value and the at least one second value, whether the gamma curve of the image acquisition device has been adjusted.

5. The method of claim 4, wherein the at least one feature parameter includes at least one of a saturation or a hue.

6. The method of claim 1, wherein the determining, based on the first frame and the second frame, whether a gamma curve of the image acquisition device has been adjusted comprises:
   determining areas of monochrome portions in the first frame;
   determining whether a maximum area among the areas exceeds an area threshold;
   in response to determining that the maximum area doesn't exceed the area threshold, determining whether a difference between a first color temperature corresponding to the first frame and a second color temperature corresponding to the second frame exceeds a color temperature threshold; and
   in response to determining that the difference exceeds the color temperature threshold, determining whether the gamma curve of the image acquisition device has been adjusted based on the first frame and the second frame.

7. The method of claim 1, wherein the correction coefficient includes a color correction matrix (CCM).

8. A system for target detection, comprising:
   at least one storage device including a set of instructions; and
   at least one processor in communication with the at least one storage device, wherein when executing the set of instructions, the at least one processor is directed to perform operations including:
      obtaining a first frame captured by an image acquisition device, a second frame captured by the image acquisition device prior to the first frame, and a correction coefficient of the first frame;
      determining, based on the first frame and the second frame, whether a gamma curve of the image acquisition device has been adjusted;
      in response to determining that the gamma curve of the image acquisition device has been adjusted, determining an adjustment coefficient of the correction coefficient based on the first frame and the second frame; and
      adjusting, based on the adjustment coefficient, the correction coefficient of the first frame.

9. The system of claim 8, wherein to obtain a correction coefficient of the first frame, the at least one processor is directed to perform operations including:
   determining a first color temperature corresponding to the first frame;
   obtaining a corresponding relationship between reference color temperatures and reference correction coefficients; and
   determining, based on the first color temperature and the corresponding relationship, the correction coefficient of the first frame.

10. The system of claim 9, wherein to obtain a corresponding relationship between reference color temperatures and reference correction coefficients, the at least one processor is directed to perform operations including:

for each reference color temperature,
  obtaining a reference frame captured by the image acquisition device under the reference color temperature;
  determining, based on the reference color temperature, reference color information of the reference frame in a reference color space; and
  determining, based on the reference color information, a reference correction coefficient corresponding to the reference color temperature for correcting the reference frame.

11. The system of claim 8, wherein to determine, based on the first frame and the second frame, whether a gamma curve of the image acquisition device has been adjusted, the at least one processor is directed to perform operations including:
  determining at least one first value of at least one feature parameter of the first frame;
  determining at least one second value of the at least one feature parameter of the second frame; and
  determining, based on the at least one first value and the at least one second value, whether the gamma curve of the image acquisition device has been adjusted.

* * * * *